US012589686B2

(12) United States Patent
Oshio et al.

(10) Patent No.: US 12,589,686 B2
(45) Date of Patent: Mar. 31, 2026

(54) LIGHT DISTRIBUTION CONTROL DEVICE, VEHICULAR LAMP SYSTEM, AND LIGHT DISTRIBUTION CONTROL METHOD

(71) Applicant: KOITO MANUFACTURING CO., LTD., Tokyo (JP)

(72) Inventors: Hirohiko Oshio, Shizuoka (JP); Yuichi Watano, Shizuoka (JP); Koji Ishihara, Shizuoka (JP); Takashi Terayama, Shizuoka (JP); Tatsuma Kitazawa, Shizuoka (JP); Takao Muramatsu, Shizuoka (JP); Shuji Matsuura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 166 days.

(21) Appl. No.: 18/462,688

(22) Filed: Sep. 7, 2023

(65) Prior Publication Data

US 2023/0415637 A1 Dec. 28, 2023

Related U.S. Application Data

(63) Continuation of application No. PCT/JP2022/011086, filed on Mar. 11, 2022.

(30) Foreign Application Priority Data

| | | |
|---|---|---|
| Mar. 16, 2021 | (JP) | 2021-042713 |
| Mar. 31, 2021 | (JP) | 2021-061664 |
| Jan. 17, 2022 | (JP) | 2022-005214 |

(51) Int. Cl.
*B60Q 1/14* (2006.01)
*B60Q 1/00* (2006.01)

(52) U.S. Cl.
CPC ......... *B60Q 1/1423* (2013.01); *B60Q 1/0023* (2013.01); *B60Q 2300/322* (2013.01); *B60Q 2300/41* (2013.01); *B60Q 2300/42* (2013.01)

(58) Field of Classification Search
CPC .............. B60Q 1/143; B60Q 2300/056; B60Q 1/1423; B60Q 2300/42; B60Q 2300/45;
(Continued)

(56) References Cited

U.S. PATENT DOCUMENTS

| | | | |
|---|---|---|---|
| 6,049,749 A | 4/2000 | Kobayashi |
| 2009/0167188 A1 | 7/2009 | Mueller et al. |

(Continued)

FOREIGN PATENT DOCUMENTS

| | | |
|---|---|---|
| DE | 102014209158 A1 | 12/2014 |
| EP | 2388164 A2 | 11/2011 |

(Continued)

OTHER PUBLICATIONS

Extended European Search Report issued on Aug. 2, 2024, in corresponding European Patent Application No. 22771332.8. (17 pages).

(Continued)

*Primary Examiner* — Wei (Victor) Y Chan
(74) *Attorney, Agent, or Firm* — BUCHANAN, INGERSOLL & ROONEY PC

(57) ABSTRACT

A light distribution control device controls formation of a light distribution pattern by a light distribution variable lamp. The light distribution control device controls the light distribution variable lamp so as to reduce an illuminance of light that illuminates a non-traveling road when a vehicle reaches a first location a predetermined distance before a forked road, while a normal light distribution pattern is formed that includes, in an illumination range thereof, a side illuminating a traveling road of the vehicle at the forked road (Continued)

1 and a side illuminating the non-traveling road, and to form a guiding light distribution pattern in which an illuminance of light that illuminates the traveling road is higher than the illuminance of the light that illuminates the non-traveling road.

9 Claims, 11 Drawing Sheets

(58) Field of Classification Search
CPC ...... B60Q 2300/41; B60Q 1/085; B60Q 1/16; B60Q 2300/054; B60Q 2300/122; B60Q 1/0023

See application file for complete search history.

(56) References Cited

U.S. PATENT DOCUMENTS

| | | | |
|---|---|---|---|
| 2012/0158254 A1 | 6/2012 | Takagaki | |
| 2016/0368414 A1* | 12/2016 | Son | F21S 41/663 |
| 2017/0066367 A1* | 3/2017 | Illium | B60Q 1/16 |
| 2017/0182931 A1* | 6/2017 | Son | F21S 41/663 |
| 2021/0253021 A1* | 8/2021 | Murase | B60Q 1/143 |
| 2021/0291719 A1* | 9/2021 | Kim | B60Q 1/12 |

FOREIGN PATENT DOCUMENTS

| | | | |
|---|---|---|---|
| EP | 2492141 | A2 | 8/2012 |
| EP | 3020602 | A1 | 5/2016 |
| EP | 3459790 | A1 | 3/2019 |
| JP | H10166934 | A | 6/1998 |
| JP | 2002193026 | A | 7/2002 |
| JP | 2009073284 | A | 4/2009 |
| JP | 2010105580 | A | 5/2010 |
| JP | 2011068271 | A | 4/2011 |
| JP | 2011233305 | A | 11/2011 |
| JP | 2012196982 | A | 10/2012 |
| JP | 2016088224 | A | 5/2016 |
| WO | 2015046346 | A1 | 4/2015 |

OTHER PUBLICATIONS

Office Action (Communication pursuant to Article 94(3) EPC) issued on Apr. 24, 2025, in corresponding European Patent Application No. 22771332.8. (5 pages).

Office Action (Communication pursuant to Rule 164(1) EPC/The Partial Supplementary European Search Report) issued on Jun. 3, 2024, in corresponding European Patent Application No. 22771332.8. (17 pages).

International Search Report (PCT/ISA/210) and Written Opinion (PCT/ISA/237) both with English translation mailed on May 10, 2022, by the Japanese Patent Office as the International Searching Authority for International Application No. PCT/JP2022/011086.

* cited by examiner

LIGHT DISTRIBUTION CONTROL DEVICE, VEHICULAR LAMP SYSTEM, AND LIGHT DISTRIBUTION CONTROL METHOD

CROSS-REFERENCE TO RELATED APPLICATIONS

This application is based upon and claims the benefit of priority from the prior Japanese Patent Application No. 2021-042713, filed on Mar. 16, 2021, the prior Japanese Patent Application No. 2021-061664, filed on Mar. 31, 2021, the prior Japanese Patent Application No. 2022-005214, filed on Jan. 17, 2022, and the International Patent Application No. PCT/JP2022/011086, filed on Mar. 11, 2022, the entire content of each of which is incorporated herein by reference.

BACKGROUND

Field of the Invention

The present invention relates to light distribution control devices, vehicular lamp systems, and light distribution control methods.

Description of the Related Art

Adaptive Driving Beam (ADB) control has been proposed in recent years that dynamically and adaptively controls a light distribution pattern based on the circumstances surrounding the vehicle. ADB control detects, with a camera, the presence of a target that is located ahead of the host vehicle and that should not be illuminated with high-luminance light, and dims the light directed toward the region corresponding to that target (see, for example, patent document 1). Examples of such targets for dimmed light include a forward vehicle, such as a leading vehicle or an oncoming vehicle. Dimming the light directed to the region corresponding to a forward vehicle can reduce glare on the driver of the forward vehicle and can also improve the visibility of the driver of the host vehicle.

Patent document 1: JP2016-088224

1. The present inventors have conducted diligent studies on ADB control of vehicular lamps and conceived of a novel method of assisting drivers in driving.

2. The present inventors have conducted diligent studies on ADB control of vehicular lamps and realized that conventional ADB control has room for reducing the sense of discomfort caused in the driver of a leading vehicle.

SUMMARY OF THE INVENTION

1. One aspect of the present invention has been made in view of such circumstances, and one object of the aspect is to provide a technology for assisting a driver in driving.

2. One aspect of the present invention has been made in view of such circumstances, and one object of the aspect is to provide a technology for reducing the sense of discomfort caused in the driver of a leading vehicle.

1. One aspect of the present invention provides a light distribution control device that controls formation of a light distribution pattern by a light distribution variable lamp capable of illuminating a region ahead of a vehicle with a visible light beam of a variable intensity distribution. This light distribution control device controls the light distribution variable lamp so as to reduce an illuminance of light that illuminates a non-traveling road when the vehicle reaches a first location a predetermined distance before a forked road, while a normal light distribution pattern is formed that includes, in an illumination range thereof, a side illuminating a traveling road of the vehicle at the forked road and a side illuminating the non-traveling road, and to form a guiding light distribution pattern in which an illuminance of light that illuminates the traveling road is higher than the illuminance of the light that illuminates the non-traveling road.

Another aspect of the present invention provides a light distribution control device that controls formation of a light distribution pattern by a light distribution variable lamp capable of illuminating a region ahead of a vehicle with a visible light beam of a variable intensity distribution. This light distribution control device controls the light distribution variable lamp so as to reduce an illuminance of light that illuminates a non-traveling road if a driver of the vehicle has indicated his or her intention to move the vehicle into a traveling road, while the light distribution control device is provided with information concerning the traveling road of the vehicle and while a normal light distribution pattern is formed that includes, in an illumination range thereof, a side illuminating the traveling road of the vehicle at a forked road and a side illuminating the non-traveling road, and to form a guiding light distribution pattern in which an illuminance of light that illuminates the traveling road is higher than the illuminance of the light that illuminates the non-traveling road.

Another aspect of the present invention provides a vehicular lamp system. This vehicular lamp system includes a light distribution variable lamp capable of illuminating a region ahead of a vehicle with a visible light beam of a variable intensity distribution, and the light distribution control device according to any of the aspects above.

Another aspect of the present invention provides a light distribution control method of controlling formation of a light distribution pattern by a light distribution variable lamp capable of illuminating a region ahead of a vehicle with a visible light beam of a variable intensity distribution. This light distribution control method includes controlling the light distribution variable lamp so as to reduce an illuminance of light that illuminates a non-traveling road when the vehicle reaches a first location a predetermined distance before a forked road, while a normal light distribution pattern is formed that includes, in an illumination range thereof, a side illuminating a traveling road of the vehicle at the forked road and a side illuminating the non-traveling road, and to form a guiding light distribution pattern in which an illuminance of light that illuminates the traveling road is higher than the illuminance of the light that illuminates the non-traveling road.

2. One aspect of the present invention provides a light distribution control device that controls formation of a light distribution pattern by a light distribution variable lamp capable of illuminating a region ahead of a vehicle with a visible light beam of a variable intensity distribution. This light distribution control device includes a situation determining unit that determines whether an object that functions as a screen onto which the light distribution pattern is projected is present in the region ahead, and a pattern determining unit that, in a situation in which a leading vehicle is present, sets a first light distribution pattern that includes a dimmed portion corresponding to the leading vehicle if it is determined that the object is not present, or sets a second light distribution pattern having such a shape that at least one or more of outlines of the dimmed portion of the first light distribution pattern are blurred or that the dimmed portion is expanded to an outer edge of the first light distribution pattern in at least one direction if it is determined that the object is present.

Another aspect of the present invention provides a vehicular lamp system. This vehicular lamp system includes a light distribution variable lamp capable of illuminating a region ahead of a vehicle with a visible light beam of a variable intensity distribution, and the light distribution control device according to the aspect above.

Another aspect of the present invention provides a light distribution control method of controlling formation of a light distribution pattern by a light distribution variable lamp capable of illuminating a region ahead of a vehicle with a visible light beam of a variable intensity distribution. This light distribution control method includes determining whether an object that functions as a screen onto which the light distribution pattern is projected is present in the region ahead, and, in a situation in which a leading vehicle is present, setting a first light distribution pattern that includes a dimmed portion corresponding to the leading vehicle if it is determined that the object is not present, or setting a second light distribution pattern having such a shape that at least one or more of outlines of the dimmed portion of the first light distribution pattern are blurred or that the dimmed portion is expanded to an outer edge of the first light distribution pattern in at least one direction if it is determined that the object is present.

It is to be noted that any optional combinations of the constituent elements above or an embodiment obtained by converting what is expressed by the present invention among a method, an apparatus, a system, and so forth is also effective as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
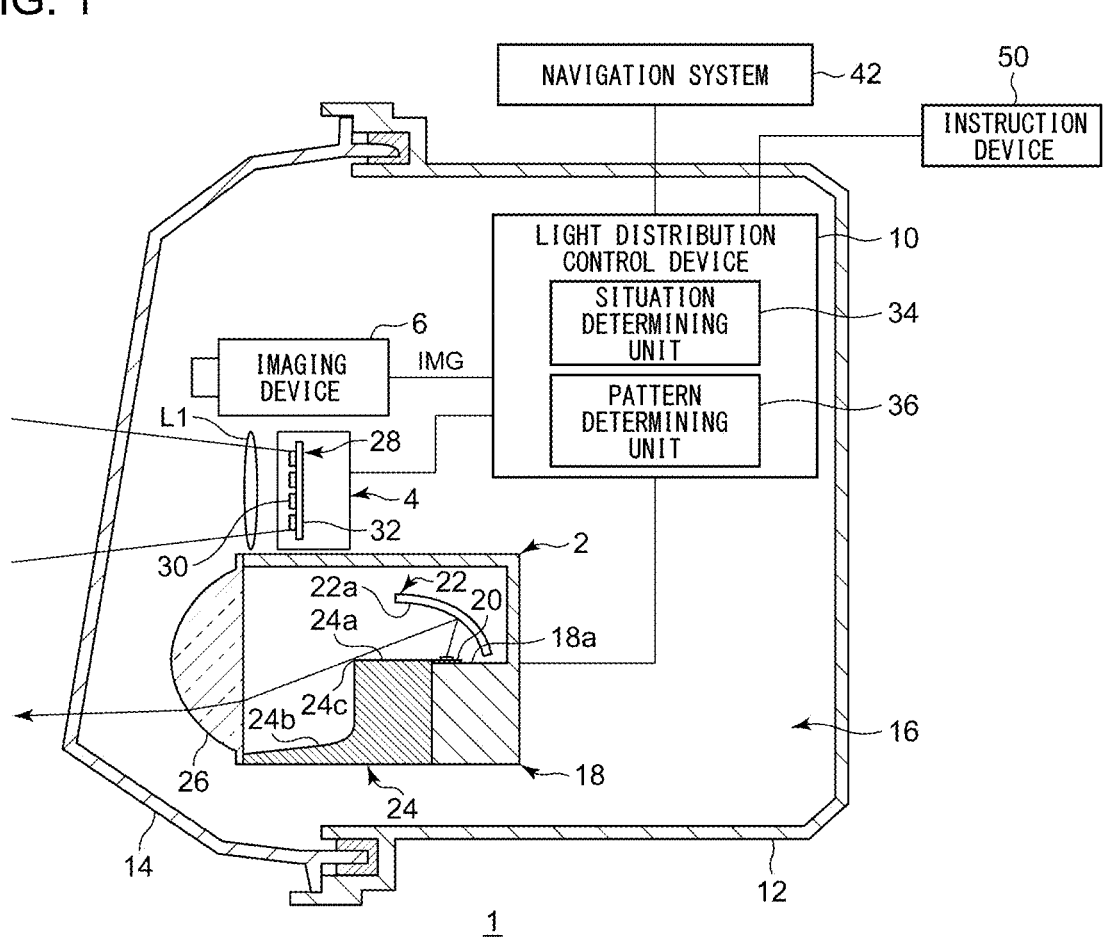
FIG. 1 shows a schematic configuration of a vehicular lamp system according to Embodiment 1.

Hereinafter, the present invention will be described based on some exemplary embodiments with reference to the drawings. The embodiments are illustrative in nature and are not intended to limit the invention. Not all the features and combinations thereof described according to the embodiments are necessarily essential to the invention. Identical or equivalent constituent elements, members, and processes illustrated in the drawings are given identical reference characters, and duplicate description thereof will be omitted as appropriate.

The scales and shapes of the components illustrated in the drawings are set merely for convenience in order to facilitate an understanding of the description and are not to be interpreted as limiting, unless specifically indicated otherwise. When terms such as "first" and "second" are used in the present specification or in the claims, these terms do not indicate the order or the levels of importance in any way and are merely used to distinguish a given configuration from another configuration, unless specifically indicated otherwise. Part of a member that is not important in describing the embodiments is omitted from the drawings.

Embodiment 1

FIG. 1 shows a schematic configuration of a vehicular lamp system 1 according to Embodiment 1. FIG. 1 depicts some of the constituent elements of the vehicular lamp system 1 in the form of functional blocks. These functional blocks are implemented, in terms of their hardware configuration, by elements and/or circuits, such as a CPU or memory of a computer, or implemented, in terms of their software configuration, by a computer program or the like. It is to be appreciated by a person skilled in the art that these functional blocks can be implemented in a variety of forms through combinations of hardware and software.

The vehicular lamp system 1 includes a low beam unit 2, an ADB unit 4, an imaging device 6, and a light distribution control device 10. The vehicular lamp system 1 according to the present embodiment further includes a lamp body 12 and a light transmissive cover 14. The lamp body 12 has an opening that opens to the front of the vehicle. The light transmissive cover 14 is mounted so as to cover the opening of the lamp body 12. The lamp body 12 and the light transmissive cover 14 form a lamp room 16. The low beam unit 2, the ADB unit 4, the imaging device 6, and the light distribution control device 10 are housed in the lamp room 16.

Herein, the imaging device 6 and the light distribution control device 10 may each be provided outside the lamp room 16, such as in the vehicle. The imaging device 6 may be constituted by an onboard camera. The whole or a part of the light distribution control device 10 may be constituted by a vehicle ECU. The low beam unit 2 and the ADB unit 4 may be housed in separate lamp rooms 16.

The low beam unit 2 includes a light source mounting portion 18, a light source 20, a reflector 22, a shade member 24, and a projection lens 26. The light source mounting portion 18 is formed, for example, by a metallic material, such as aluminum, and is supported on the lamp body 12 via a bracket (not illustrated). The light source mounting portion 18 has a light source mounting surface 18a. The light source mounting surface 18a according to the present embodiment extends in a substantially horizontal direction. The light source 20 is mounted on the light source mounting surface 18a.

The light source 20 is, for example, a light emitting diode (LED). The light source 20 may also be, for example but not limited to, a semiconductor light source other than an LED, such as a laser diode (LD) or an organic or inorganic electroluminescence (EL) element; an incandescent lamp; a halogen lamp; or a discharge lamp. The light source 20 emits light toward the reflector 22. The reflector 22 has a generally dome-like shape. The reflector 22 is disposed so as to cover the light source 20 from directly above in the vertical direction and is fixed to the light source mounting portion 18. The reflector 22 has a reflective surface 22a formed by a part of a spheroidal surface. The reflective surface 22a has a first focal point and a second focal point. The second focal point is located further to the front of the lamp than is the first focal point. The position of the reflector 22 relative to the light source 20 is set such that the position of the light source 20 substantially coincides with the first focal point of the reflective surface 22a.

The shade member 24 is fixed to the side of the light source mounting portion 18 on the lamp's front side. The shade member 24 includes a flat portion 24a disposed substantially horizontally and a curved portion 24b located further to the front of the lamp than is the flat portion 24a. The curved portion 24b is curved downward so as not to block the entry of light source light into the projection lens 26. The position of the reflector 22 relative to the shade member 24 is set such that a ridge 24c formed by the flat portion 24a and the curved portion 24b is located around the second focal point of the reflective surface 22a. The projection lens 26 is fixed at the leading end of the curved portion 24b. The projection lens 26 is formed, for example, by a plano-convex aspherical lens and projects an inverted image of a light source image formed in a posterior focal plane onto a virtual vertical screen in front of the lamp. The projection lens 26 is disposed in the optical axis of the low beam unit 2 such that the posterior focal point of the projection lens 26 substantially coincides with the second focal point of the reflective surface 22a.

Light emitted from the light source 20 is reflected by the reflective surface 22a, travels near the ridge 24c, and enters the projection lens 26. The light that has entered the projection lens 26 illuminates the space in front of the lamp as substantially parallel light. At this point, the shade member 24 blocks part of the light emitted by the light source 20 from traveling to the front of the lamp. Specifically, part of the light emitted from the light source 20 is reflected by the flat portion 24a. In other words, the light from the light source 20 is selectively cut off at the ridge 24c serving as a boundary. Thus, a light distribution pattern including a cutoff line corresponding to the shape of the ridge 24c, that is, a low beam light distribution pattern (see FIG. 2) is formed in the region ahead of the vehicle.

It is to be noted that the structure of the low beam unit 2 is not limited to the one described above, and a known structure can be employed. For example, the shade member 24 that forms a cutoff line may be of a shutter type in which a shade plate moves back and forth with respect to the optical axis. The low beam unit 2 does not have to include the reflector 22 and/or the projection lens 26.

The ADB unit 4 is constituted by a light distribution variable lamp capable of illuminating a region ahead of the host vehicle with a visible light beam L1 of a variable intensity distribution. The ADB unit 4 is supported on the lamp body 12 via a bracket (not illustrated). The ADB unit 4 according to the present embodiment includes a light source array 28. The light source array 28 includes a plurality of light sources 30 arrayed in a matrix and a circuit board 32 that turns on or off the light sources 30 independently of each other. Preferred examples of a light source 30 include a semiconductor light emitting element, such as an LED, an LD, or an organic or inorganic EL element. The number of the light sources 30, that is, the resolving power (the resolution) of the ADB unit 4 is, for example, from 1,000 pixels to 1,300,000 pixels.

It is to be noted that the structure of the ADB unit 4 is not limited to the one described above, and a known structure can be employed. The light distribution variable lamp constituting the ADB unit 4 may be, for example but not limited to, a pattern forming device of a matrix type, such as a digital mirror device (DMD) or a liquid crystal device, or a pattern forming device of a scan optic type that scans the space ahead of the host vehicle with light source light. The low beam unit 2 and the ADB unit 4 may be integrated into a unit.

The imaging device 6 has sensitivity to the visible light range and generates an image IMG by capturing an image of the region ahead of the vehicle. An image IMG that the imaging device 6 has acquired is sent to the light distribution control device 10. The imaging device 6 captures an image of the space ahead of the host vehicle repeatedly at predetermined timings and sends an image IMG to the light distribution control device 10 each time the imaging device 6 acquires an image IMG.

The light distribution control device 10 includes, in one example, a situation determining unit 34 and a pattern determining unit 36. The light distribution control device 10 can be constituted by a digital processor. The light distribution control device 10 may be constituted, for example but not limited to, by a combination of a microcomputer including a CPU and a software program or by a field programmable gate array (FPGA) or an application specific IC (ASIC). Each unit of the light distribution control device 10 operates as an integrated circuit constituting the light distribution control device 10 executes a program stored in a memory.

Figure 2:
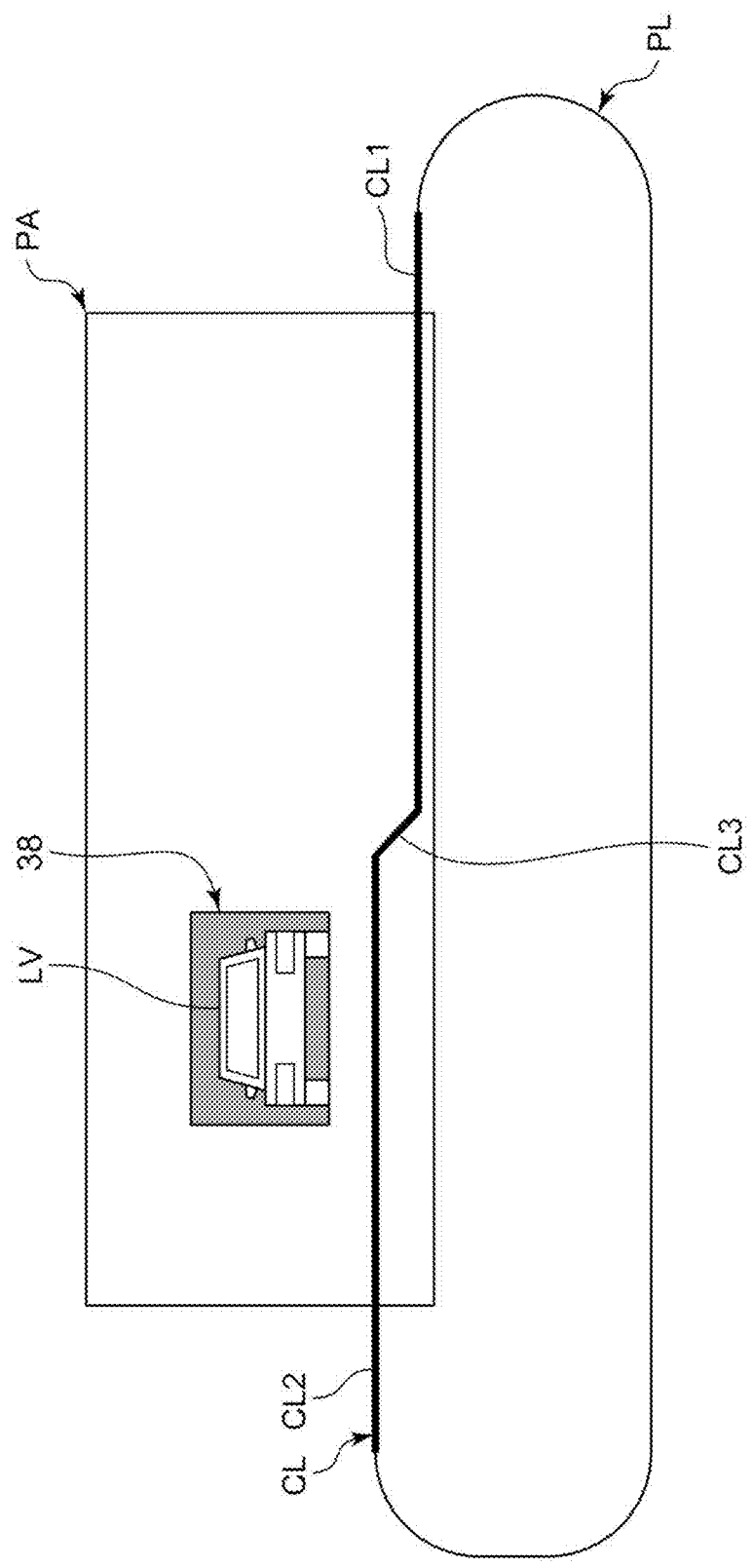
FIG. 2 is a schematic diagram showing a light distribution pattern that a low beam unit and an ADB unit form.

The light distribution control device 10 controls formation of a light distribution pattern by the low beam unit 2 and the ADB unit 4. A shape of a light distribution pattern formed by each lamp unit and control, by the light distribution control device 10, of formation of a light distribution pattern will be described below. FIG. 2 is a schematic diagram showing a light distribution pattern that the low beam unit 2 and the ADB unit 4 form. A light distribution pattern is understood as a two-dimensional illuminance distribution of an illumination pattern that each lamp unit forms on a virtual vertical screen in front of the host vehicle. FIG. 2 shows a light distribution pattern for a road where vehicles travel on the left-hand side.

The low beam unit 2 can form a low beam light distribution pattern PL by projecting light from the light source 20. The low beam light distribution pattern PL has a cutoff line CL at its upper end. The cutoff line CL includes a first partial cutoff line CL1, a second partial cutoff line CL2, and a third partial cutoff line CL3. The first partial cutoff line CL1 extends in the horizontal direction in an oncoming lane. The second partial cutoff line CL2 extends in the horizontal direction in the host vehicle's lane and at a position higher than the position of the first partial cutoff line CL1. The third partial cutoff line CL3 extends diagonally between the first partial cutoff line CL1 and the second partial cutoff line CL2 so as to connect the first partial cutoff line CL1 and the second partial cutoff line CL2.

The ADB unit 4 can form a light distribution variable pattern PA above the cutoff line CL by projecting light from the plurality of light sources 30. The light distribution variable pattern PA is formed, for example, in a region where a known high beam light distribution pattern is to be formed. The light distribution variable pattern PA has a structure formed by a collection of a plurality of partial regions arrayed in a matrix. In one example, the partial regions and the light sources 30 are in a one-to-one correspondence. The illuminance of each partial region can be controlled independently of each other as the lit state of each light source 30 is adjusted.

The light distribution control device 10 can execute ADB control as described below. Specifically, the light distribution control device 10 finds the presence and position of a forward vehicle based on an image IMG obtained from the imaging device 6. A forward vehicle includes a leading vehicle and an oncoming vehicle. In FIG. 2, a leading vehicle LV is shown as an example. The light distribution control device 10 can find the presence and position of a forward vehicle by subjecting an image IMG to known image processing or a known image analysis. The light distribution control device 10 can differentiate between a leading vehicle LV and an oncoming vehicle based, for example, on the position of the forward vehicle or on the difference between the red color of a tail lamp or a stop lamp and the white color of a headlamp. Herein, the light distribution control device 10 may detect a forward vehicle based on a measurement result of a range finding sensor (not illustrated). The light distribution control device 10 may acquire information concerning a forward vehicle from a vehicle ECU.

Upon detecting a forward vehicle, the light distribution control device 10 sets, in a light distribution variable pattern PA, a dimmed portion 38 that overlaps the forward vehicle. The light distribution control device 10 then controls the ADB unit 4 so as to form a light distribution variable pattern PA that includes the dimmed portion 38. The light distribution variable pattern PA includes, in its illumination range, a region above the cutoff line CL of the low beam light distribution pattern PL. Thus, the dimmed portion 38 may be formed in the region above the cutoff line CL.

According to the present embodiment, the illuminance of the dimmed portion 38 is substantially zero. Herein, the illuminance of the dimmed portion 38 may be higher than zero but lower than the illuminance of a portion that overlaps a region in which no forward vehicle is present. The illuminance of the dimmed portion 38 can be set as appropriate based, for example, on experiments or simulations with, for example, the degree of glare experienced by the driver of a forward vehicle taken into consideration. Forming the light distribution variable pattern PA that includes the dimmed portion 38 can reduce the glare on the driver of the forward vehicle and can also improve the visibility of the driver of the host vehicle.

Figure 3A:
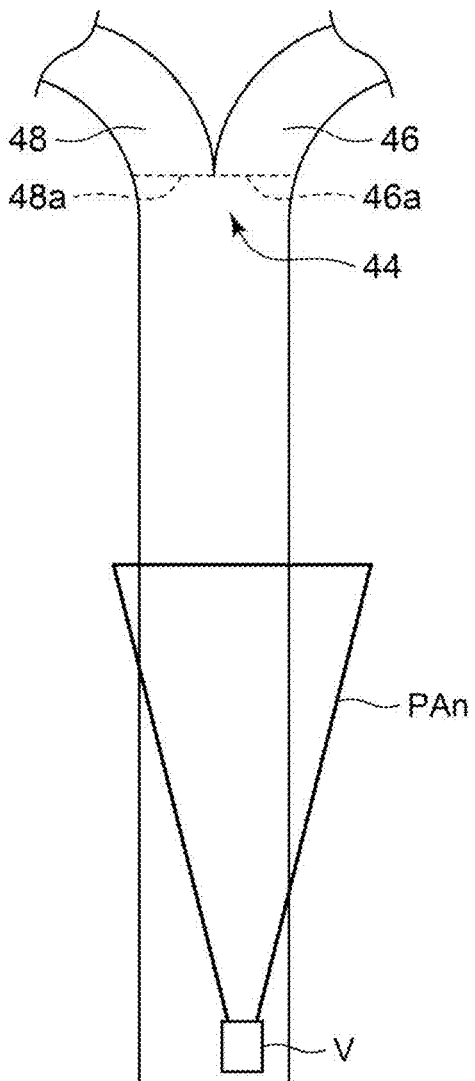
FIGS. 3A and 3B are schematic diagrams for describing gaze guiding control.
Figure 3B:
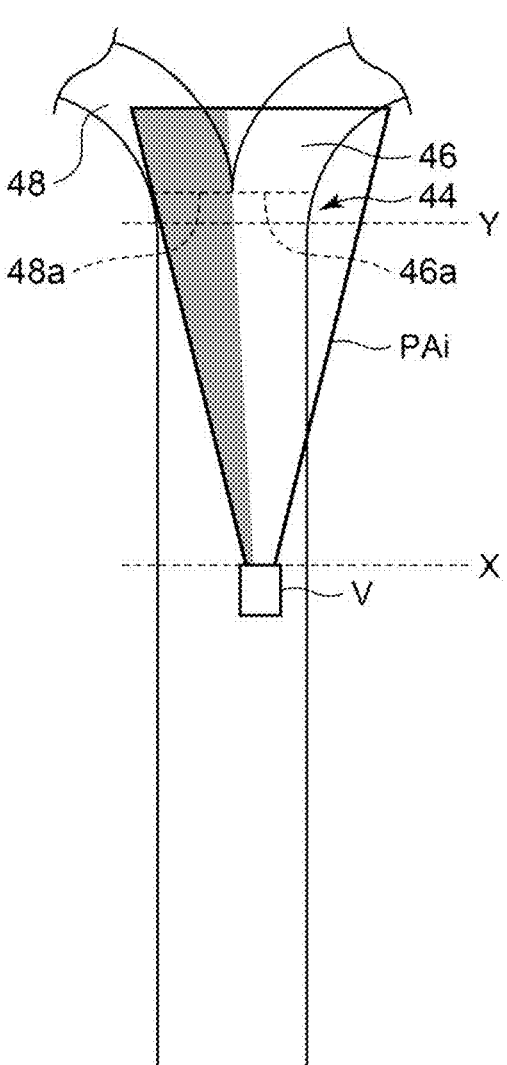
Figure 4:
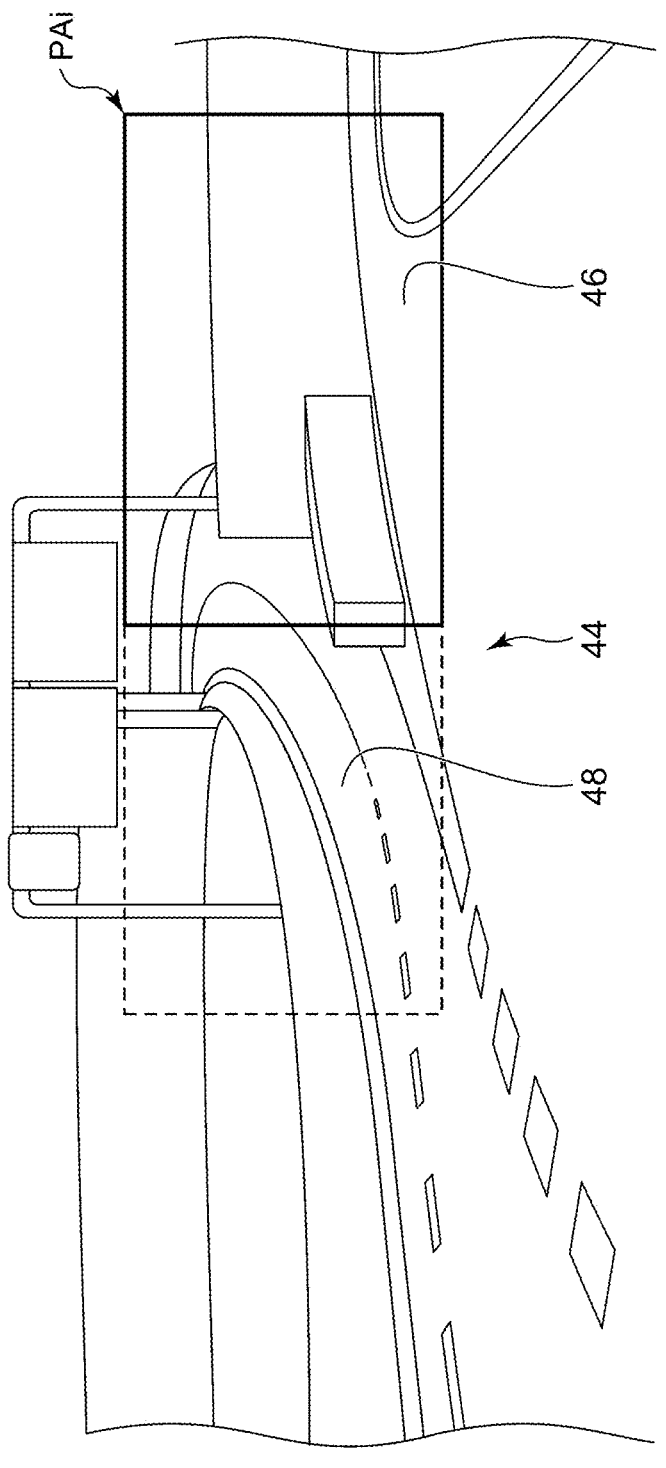
FIG. 4 is a schematic diagram for describing gaze guiding control.

The light distribution control device 10 can also execute gaze guiding control as described below. In one example, gaze guiding control is executed as part of ADB control. FIGS. 3A, 3B, and 4 are schematic diagrams for describing gaze guiding control. As shown in FIG. 3A, a forked road 44 may be present ahead of the vehicle V. In one example, the forked road 44 branches into two. The vehicle V may be to take, for example, the right at the forked road 44. The fact that the forked road 44 is present ahead of the vehicle V or the direction to which the vehicle V is to turn at the forked road 44 can be found as, for example, information concerning the travel route of the vehicle V is acquired from a navigation system 42 provided in the vehicle.

The vehicle V has a normal light distribution pattern PAn formed. This normal light distribution pattern PAn is a pattern that, when the forked road 44 is illuminated therewith, includes, in its illumination range, a side illuminating a traveling road 46 of the vehicle V at the forked road 44 and a side illuminating a non-traveling road 48.

That the normal light distribution pattern PAn includes, in its illumination range, a side illuminating the traveling road 46 means that the light of the normal light distribution pattern PAn can illuminate at least a portion of the road surface of a traveling road entrance 46a, or at least a portion of a region extending vertically above such a road surface, or both. In a similar manner, that the normal light distribution pattern PAn includes, in its illumination range, a side illuminating the non-traveling road 48 means that the light of the normal light distribution pattern PAn can illuminate at least a portion of the road surface of a non-traveling road entrance 48a, or at least a portion of a region extending vertically above such a road surface, or both. The traveling road entrance 46a and the non-traveling road entrance 48a are positions at which the road starts to branch into, respectively, the traveling road 46 and the non-traveling road 48. The normal light distribution pattern PAn is, for example, the light distribution variable pattern PA shown in FIG. 2. Therefore, if a forward vehicle is present, the normal light distribution pattern PAn may include a dimmed portion 38.

The situation determining unit 34 determines whether the vehicle V has reached a first location X a predetermined distance before the forked road 44 (e.g., the traveling road entrance 46a). The situation determining unit 34 can find that the vehicle V has reached the first location X by, for example, acquiring position information of the vehicle V from the navigation system 42. Herein, the situation determining unit 34 may find the position of the vehicle V based on a known sensor, other than the navigation system 42, that measures a current position of the vehicle V. Alternatively, the situation determining unit 34 can find the presence of the forked road 44 ahead and the distance to the forked road 44 based, for example, on an image IMG acquired from the imaging device 6 or on a detection result of a range finding sensor. The situation determining unit 34 sends the determination result to the pattern determining unit 36.

The "predetermined distance," that is, the distance from the forked road 44 to the first location X can be set as appropriate based, for example, on experiments or simulations. The predetermined distance is, for example, the distance over which the visible light beam L1 emitted from the ADB unit 4 can reach the forked road 44. The distance over which the visible light beam L1 can reach the forked road 44 means, for example, the distance at which, when the ADB unit 4 located at this distance from a virtual vertical screen illuminates the virtual vertical screen with a visible light beam L1, an outline of a light distribution pattern that a person can visually recognize from a certain position is formed on the screen. This distance is, for example, the distance at which the illuminance of the virtual vertical screen illuminated by the visible light beam L1 is no lower than 0.6 lux. The distance over which the visible light beam L1 can reach the forked road 44 can be set as appropriate based, for example, on experiments or simulations, and the distance is, for example, from 200 meters to 300 meters. Information about the predetermined distance is prestored in the situation determining unit 34.

If the situation determining unit 34 determines that the vehicle V has reached the first location X while the normal light distribution pattern PAn is formed, the pattern determining unit 36 sets a pattern in which the ADB unit 4 forms a guiding light distribution pattern PAi, as shown in FIGS. 3B and 4. Then, the pattern determining unit 36 sends the determined pattern information to the ADB unit 4 and causes the ADB unit 4 to form the guiding light distribution pattern PAi. In other words, the first location X serves as a guidance start location. The guiding light distribution pattern PAi is a light distribution pattern in which the illuminance of the light illuminating the traveling road 46 is higher than the illuminance of the light illuminating the non-traveling road 48. Herein, the pattern determining unit 36 may receive a signal indicating that the vehicle V has reached the first location X directly from, for example, the navigation system 42.

The pattern determining unit 36 switches from the normal light distribution pattern PAn to the guiding light distribution pattern PAi by controlling the ADB unit 4 so as to reduce the illuminance of the light that illuminates the non-traveling road 48 in the normal light distribution pattern PAn. The degree by which the illuminance of the light that illuminates the non-traveling road 48 is reduced can be set as appropriate based, for example, on experiments or simulations with, for example, an influence that the brightness difference has on the visibility of the driver taken into consideration. In one example, the illuminance of the light that illuminates the non-traveling road 48 in the guiding light distribution pattern PAi is the same as the illuminance of a dimmed portion 38.

The guiding light distribution pattern PAi has a brightness contrast in which the side illuminating the traveling road 46 is brighter and the side illuminating the non-traveling road 48 is darker. Therefore, forming the guiding light distribution pattern PAi can make the traveling road 46 brighter than the non-traveling road 48 and can guide the driver's gaze to the traveling road 46.

It suffices that the guiding light distribution pattern PAi be such that, in the driver's field of view, the illuminance of a portion that overlaps at least a portion of the road surface of the traveling road entrance 46a, or the illuminance of a portion that overlaps at least a portion of a region that extends vertically above such a road surface, or the illuminance of both is higher than the illuminance of a portion that overlaps at least a portion of the road surface of the non-traveling road entrance 48a, or the illuminance of a portion that overlaps at least a portion of a region that extends vertically above such a road surface, or the illuminance of both.

In other words, it suffices that the guiding light distribution pattern PAi illuminates at least a portion of the road surface of the traveling road entrance 46a and a region above that road surface more brightly than at least a portion of the road surface of the non-traveling road entrance 48a and a region above that road surface. Preferably, the guiding light distribution pattern PAi illuminates at least a portion of a region on the traveling road side (the road surface at the entrance and a region above the road surface) more brightly than the entire region on the non-traveling road side (the road surface at the entrance and a region above the road surface). For example, the guiding light distribution pattern PAi illuminates the road surface of the traveling road entrance 46a more brightly than the road surface of the non-traveling road entrance 48a. Alternatively, the guiding light distribution pattern PAi illuminates a region above the road surface of the traveling road entrance 46a more brightly than a region above the road surface of the non-traveling road entrance 48a. Preferably, the guiding light distribution pattern PAi creates a brightness contrast between the road surface of the traveling road entrance 46a and of the non-traveling road entrance 48a and a region extending above these road surfaces.

The guiding light distribution pattern PAi according to the present embodiment is formed so as to overlap a region above the cutoff line CL of the low beam light distribution pattern PL. The pattern determining unit 36 according to the present embodiment controls the ADB unit 4 so as to form the guiding light distribution pattern PAi regardless of the road shape of the traveling road 46. Therefore, even if the traveling road 46 is, for example, straight, the guiding light distribution pattern PAi is formed upon the vehicle V reaching the first location X. The pattern determining unit 36 according to the present embodiment controls the ADB unit 4 so as to form the guiding light distribution pattern PAi regardless of the driver's steering. Therefore, the guiding light distribution pattern PAi is formed even if the road that the vehicle V is traveling at the timing of forming the guiding light distribution pattern PAi, that is, the road at the first location X is, for example, straight.

Herein, the intensity distribution of the guiding light distribution pattern PAi can be set as appropriate as long as the illuminance of the light that illuminates the non-traveling road 48 is reduced when the normal light distribution pattern PAn is switched to the guiding light distribution pattern PAi and a condition regarding the brightness contrast between the traveling road 46 and the non-traveling road 48 is satisfied. Therefore, the illuminance of the light that illuminates the traveling road 46 may be increased or reduced when the normal light distribution pattern PAn is switched to the guiding light distribution pattern PAi.

In one example, the situation determining unit 34 determines whether the vehicle V has reached a second location Y that is before the forked road 44 and that is closer than the first location X to the forked road 44. The situation determining unit 34 can find that the vehicle V has reached the second location Y based on information obtained from, for example, the navigation system 42, other position sensors, an image IMG, or a range finding sensor. The situation determining unit 34 sends the determination result to the pattern determining unit 36. If the situation determining unit 34 determines that the vehicle V has reached the second location Y, the pattern determining unit 36 controls the ADB unit 4 so as to switch the guiding light distribution pattern PAi to the normal light distribution pattern PAn. In other words, the second location Y serves as a guidance end location. The distance from the forked road 44 to the second location Y can be set as appropriate based, for example, on experiments or simulations, and the distance is, for example, 30 meters. Information regarding the second location Y is prestored in the situation determining unit 34. Herein, the pattern determining unit 36 may receive a signal indicating that the vehicle V has reached the second location Y directly from, for example, the navigation system 42.

Figure 5:
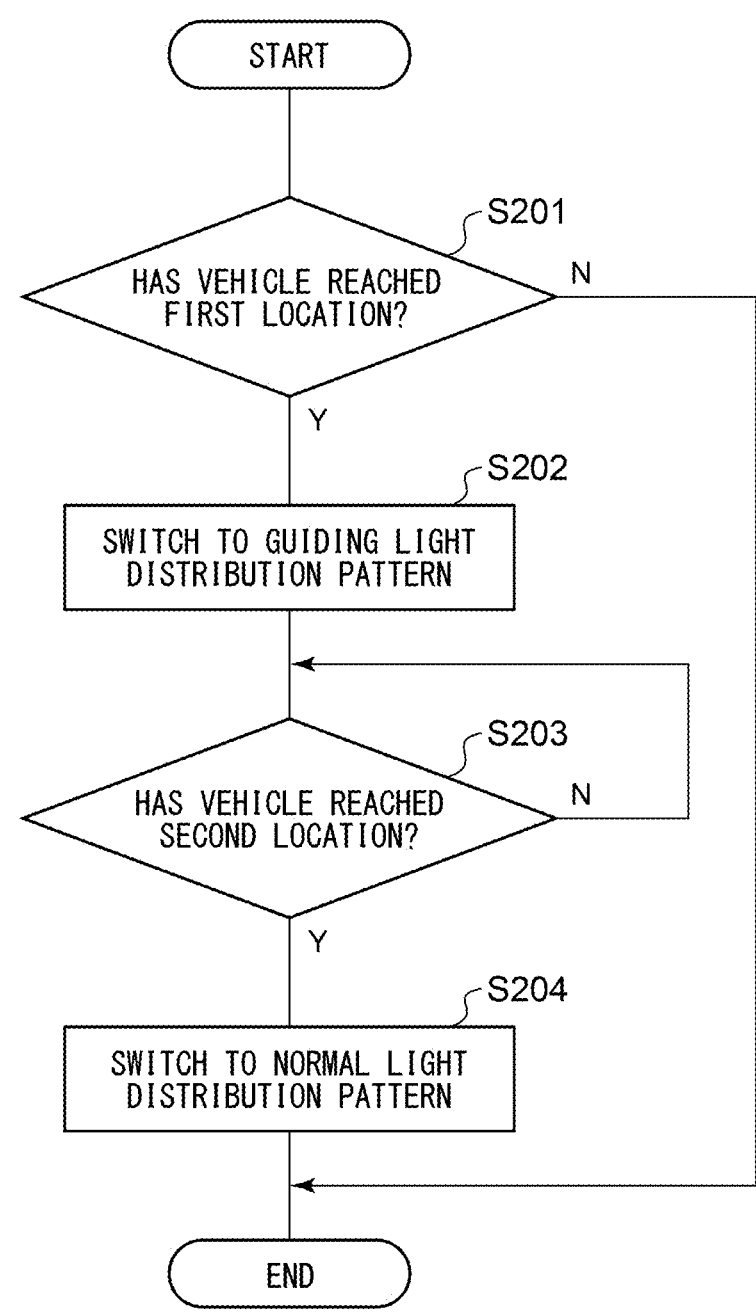
FIG. 5 is a flowchart showing an example of gaze guiding control that a light distribution control device executes.

FIG. 5 is a flowchart showing an example of gaze guiding control that the light distribution control device 10 executes. This flow is executed repeatedly at predetermined timings, for example, when execution of ADB control is instructed via a light switch (not illustrated) and when the ignition is on. In one example, gaze guiding control is executed as part of ADB control. In ADB control, a normal light distribution pattern PAn (light distribution variable pattern PA) is formed steadily. Therefore, inevitably, gaze guiding control is executed while a normal light distribution pattern PAn is formed.

The light distribution control device 10 determines whether the vehicle V has reached the first location X (S201). If the vehicle V has not reached the first location X (N at S201), the light distribution control device 10 terminates this routine. If the vehicle V has reached the first location X (Y at S201), the light distribution control device 10 controls the ADB unit 4 so as to switch the normal light distribution pattern PAn to the guiding light distribution pattern PAi (S202).

Then, the light distribution control device 10 determines whether the vehicle V has reached the second location Y (S203). If the vehicle V has not reached the second location Y (N at S203), the light distribution control device 10 repeats the determination at step S203. If the vehicle V has reached the second location Y (Y at S203), the light distribution control device 10 controls the ADB unit 4 so as to switch the guiding light distribution pattern PAi to the normal light distribution pattern PAn (S204), and terminates this routine. Herein, even while the normal light distribution pattern PAn is not formed, the guiding light distribution pattern PAi may be formed when the vehicle V reaches the first location X.

As described above, the light distribution control device 10 according to the present embodiment controls formation of a light distribution pattern by the ADB unit 4 (a light distribution variable lamp) capable of illuminating a region ahead of the vehicle V with a visible light beam L1 of a variable intensity distribution. The light distribution control device 10 controls the ADB unit 4, while the normal light distribution pattern PAn is formed that includes, in its illumination range, the side illuminating the traveling road 46 of the vehicle V at the forked road 44 and the side illuminating the non-traveling road 48, to reduce the illuminance of the light that illuminates the non-traveling road 48 when the vehicle V reaches the first location X the predetermined distance before the forked road 44 so as to form the guiding light distribution pattern PAi in which the illuminance of the light that illuminates the traveling road 46 is higher than the illuminance of the light that illuminates the non-traveling road 48.

In this manner, the gaze of the driver of the vehicle V can be guided to the traveling road 46 by illuminating the traveling road 46 more brightly than the non-traveling road 48 when the vehicle V is to reach the forked road 44. Furthermore, this configuration can show the driver which way to proceed. Accordingly, this configuration can assist the driver in driving.

According to the present embodiment, the distance from the forked road 44 to the first location X is the distance over which the visible light beam L1 can reach the forked road 44. This configuration enables the guiding light distribution pattern PAi to reach the traveling road entrance 46a and the non-traveling road entrance 48a more reliably. Accordingly, the effectiveness of forming the guiding light distribution pattern PAi can be further increased. Furthermore, forming the normal light distribution pattern PAn until the vehicle V reaches the first location X can increase the visibility of the driver.

The guiding light distribution pattern PAi according to the present embodiment is formed so as to overlap a region above the cutoff line CL of the low beam light distribution pattern PL. The driver can more easily see the region above the cutoff line CL. Therefore, the effectiveness of forming the guiding light distribution pattern PAi can be further increased.

The light distribution control device 10 sets a light distribution pattern in which the ADB unit 4 forms the guiding light distribution pattern PAi, regardless of the road shape of the traveling road 46. With this configuration, the driver's gaze can be guided to the traveling road 46, regardless of the shape of the road ahead of the traveling road entrance 46a. The light distribution control device 10 sets a light distribution pattern in which the ADB unit 4 forms the guiding light distribution pattern PAi, regardless of the driver's steering. With this configuration, the driver's gaze can be guided to the traveling road 46, regardless of the shape of the road that the vehicle V is traveling at the time of forming the guiding light distribution pattern PAi. Accordingly, this configuration can further assist the driver in driving.

The light distribution control device 10 controls the ADB unit 4 so as to switch the guiding light distribution pattern PAi to the normal light distribution pattern PAn when the vehicle V reaches the second location Y that is before the forked road 44 and that is closer than the first location X to the forked road 44. This configuration makes it possible to more quickly revert to the state in which the driver's visibility is high.

Modified Example 1

The light distribution control device 10 according to Embodiment 1 switches the guiding light distribution pattern PAi to the normal light distribution pattern PAn when the vehicle V reaches the second location Y. In contrast, a light distribution control device 10 according to the present modified example controls the ADB unit 4 so as to switch the guiding light distribution pattern PAi to the normal light distribution pattern PAn when a predetermined stop instruction signal instructing that the formation of the guiding light distribution pattern PAi is to be stopped is received from the outside of the light distribution control device 10. A stop instruction signal is a signal concerning other than the position information of the vehicle V. For example, the vehicular lamp system 1 includes an instruction device 50, as shown in FIG. 1. The instruction device 50 sends a stop instruction signal to the light distribution control device 10. In response to receiving the stop instruction signal from the instruction device 50, the light distribution control device 10 controls the ADB unit 4 so as to switch the guiding light distribution pattern PAi to the normal light distribution pattern PAn. This configuration can increase the flexibility in the timing of switching from a guiding light distribution pattern PAi to a normal light distribution pattern PAn.

Examples of the instruction device 50 include a voice input device or a cancel button. In this case, a stop instruction signal is sent to the light distribution control device 10 when, for example, the driver provides a voice input instructing that the formation of the guiding light distribution pattern PAi is to be stopped or when, for example, the driver operates the cancel button. The instruction device 50 may be a device that sends information concerning the state or operation of the vehicle V. Examples of such an instruction device 50 include a steering angle sensor (a steering sensor) that detects the steering angle of the steering wheel. In this case, a stop instruction signal is served, for example, by a signal that indicates a steering angle no smaller than a predetermined value and that is sent from the steering sensor to the light distribution control device 10 after the guiding light distribution pattern PAi has been formed. The "predetermined value" can be set as appropriate based, for example, on experiments or simulations. Another example is a light switch for switching on or off a turn signal lamp (not illustrated). In this case, a stop instruction signal is served, for example, by a signal sent from the light switch to the light distribution control device 10 to turn on a signal lamp.

Embodiment 2

A light distribution control device 10 according to Embodiment 2 has a configuration common to the configuration according to Embodiment 1, except that their contents of control differ from each other. The light distribution control device 10 according to the present embodiment will be described below with the description centered on its configuration that differs from Embodiment 1, and description of configurations that are common between the two will be simplified or omitted.

The light distribution control device 10 controls formation of a light distribution pattern by the ADB unit 4 (a light distribution variable lamp) capable of illuminating a region ahead of a vehicle V with a visible light beam L1 of a variable intensity distribution. The light distribution control device 10 according to the present embodiment controls the ADB unit 4 so as to reduce the illuminance of the light that illuminates a non-traveling road 48 if the driver of the vehicle V has indicated his or her intention to move the vehicle V into a traveling road 46, while the light distribution control device 10 is given information concerning the traveling road 46 of the vehicle V and while a normal light distribution pattern PAn is formed that includes, in its illumination range, a side illuminating the traveling road 46 of the vehicle V at a forked road 44 and a side illuminating the non-traveling road 48, and to form a guiding light distribution pattern PAi in which the illuminance of the light that illuminates the traveling road 46 is higher than the illuminance of the light that illuminates the non-traveling road 48.

In one example, the information concerning the traveling road 46 of the vehicle V is information concerning the travel route of the vehicle V sent from the navigation system 42 to the light distribution control device 10. This information is information concerning the traveling road 46 at the first forked road 44 that the vehicle V reaches from its current position. Assigning information to the light distribution control device 10 regarding the traveling road 46 of the vehicle V is, for example, that the situation determining unit 34 ascertain that the vehicle V has reached the first location X a predetermined distance before the target forked road 44, acquiring from the imaging device 6 an image IMG capturing the target forked road 44, or obtaining a signal from the navigation system 42 indicating that the driving guidance into the traveling road 46 has been executed through audio or visual rendering by the navigation system 42.

In one example, the intention to move the vehicle V into the traveling road 46 is indicated by a steering angle signal indicating that the driver has steered the steering wheel toward the traveling road 46, and this signal is sent from the steering angle sensor to the light distribution control device 10. In another example, such an intention is indicated by a signal instructing that the turn signal lamp for the traveling road 46 is to be turned on, and this signal is sent from the light switch to the light distribution control device 10. In these cases, the instruction device 50 shown in FIG. 1 can be regarded as a device that transmits the intention that the driver has indicated to the light distribution control device 10.

In other words, the light distribution control device 10 according to the present embodiment switches the normal light distribution pattern PAn to the guiding light distribution pattern PAi upon two triggers, namely, determination of a situation of the vehicle V including, for example, finding of the traveling road 46 and the indication of the driver's intention. Such control as well can assist the driver in driving.

In one example, the light distribution control device 10 continues to form the normal light distribution pattern PAn if the driver has indicated his or her intention to move the vehicle V into the non-traveling road 48 even if the light distribution control device 10 has been provided with information concerning the traveling road 46. The light distribution control device 10 may restore the light distribution pattern to the normal light distribution pattern PAn from the guiding light distribution pattern PAi if, after the light distribution control device 10 has formed the guiding light distribution pattern PAi in response to being provided with the driver's intention to move the vehicle V into the traveling road 46, the light distribution control device 10 is provided with the driver's intention to move the vehicle V into the non-traveling road 48 or the light distribution control device 10 determines, based on information obtained from the vehicle V, that the driver has failed to move the vehicle V into the traveling road 46.

The light distribution control device 10 may move a hot zone of the guiding light distribution pattern PAi upward when the traveling road 46 is an uphill or move a hot zone of the guiding light distribution pattern PAi downward when the traveling road 46 is a downhill. A hot zone is a portion of a light distribution pattern where the luminance is higher than the rest of the light distribution pattern and is a portion that illuminates, of the region ahead of the vehicle V, a region where a particularly high visibility is required. Whether the traveling road 46 is an uphill or a downhill can be determined based on the shape of the traveling road 46 captured in an image IMG or information acquired from the navigation system 42.

Thus far, Embodiments 1 and 2 of the present invention have been described in detail. Embodiments 1 and 2 described above merely illustrate specific examples for implementing the present invention. The content of the embodiments does not limit the technical scope of the present invention, and a number of design changes, including modification, addition, and deletion of constituent elements, can be made within the scope that does not depart from the sprit of the invention defined by the claims. A new embodiment resulting from adding a design change has advantageous effects of the embodiment combined as well as the advantageous effects of the modification. With regard to the embodiments described above, the expressions "according to the present embodiment," "in the present embodiment," and so on are added for emphasis to the content that can be subjected to such a design change as described above, but such a design change is permitted also on the content without these expressions. A desired combination of the constituent elements described above is also valid as an aspect of the present invention. Hatching added along a section in the drawings does not limit the material of such with hatching.

The invention according to Embodiment 1 or 2 described above may be identified by the items indicated below.

[Item 1]

A light distribution control device (10) that controls formation of a light distribution pattern (PAn, PAi) by a light distribution variable lamp (4) capable of illuminating a region ahead of a vehicle (V) with a visible light beam (L1) of a variable intensity distribution, wherein the light distribution control device (10) controls the light distribution variable lamp (4) so as to reduce an illuminance of light that illuminates a non-traveling road (48) when the vehicle (V) reaches a first location (X) a predetermined distance before a forked road (44), while a normal light distribution pattern (PAn) is formed that includes, in an illumination range thereof, a side illuminating a traveling road (46) of the vehicle (V) at the forked road (44) and a side illuminating the non-traveling road (48), and to form a guiding light distribution pattern (PAi) in which an illuminance of light that illuminates the traveling road (46) is higher than the illuminance of the light that illuminates the non-traveling road (48).

[Item 2]

The light distribution control device (10) according to Item 1, wherein the predetermined distance is a distance over which the visible light beam (L1) can reach the forked road (44).

[Item 3]

The light distribution control device (10) according to Item 1 or 2, wherein the guiding light distribution pattern (PAi) is formed so as to overlap a region above a cutoff line (CL) of a low beam light distribution pattern (PL).

[Item 4]

The light distribution control device (10) according to any one of Items 1 to 3, wherein the light distribution control device (10) controls the light distribution variable lamp (4) so as to form the guiding light distribution pattern (PAi) regardless of a road shape of the traveling road (46).

[Item 5]

The light distribution control device (10) according to any one of Items 1 to 4, wherein the light distribution control device (10) controls the light distribution variable lamp (4) so as to form the guiding light distribution pattern (PAi) regardless of a driver's steering.

[Item 6]

The light distribution control device (10) according to any one of Items 1 to 5, wherein the light distribution control device (10) controls the light distribution variable lamp (4) so as to switch the guiding light distribution pattern (PAi) to the normal light distribution pattern (PAn) when the vehicle (V) reaches a second location (Y) that is before the forked road (44) and that is closer than the first location (X) to the forked road (44).

[Item 7]

The light distribution control device (10) according to any one of Items 1 to 5, wherein the light distribution control device (10) controls the light distribution variable lamp (4) so as to switch the guiding light distribution pattern (PAi) to the normal light distribution pattern (PAn) in response to receiving a predetermined stop instruction signal from an outside of the light distribution control device (10).

[Item 8]

A light distribution control device (10) that controls formation of a light distribution pattern (PAn, PAi) by a light distribution variable lamp (4) capable of illuminating a region ahead of a vehicle (V) with a visible light beam (L1) of a variable intensity distribution, wherein the light distribution control device (10) controls a light distribution variable lamp (4) so as to reduce an illuminance of light that illuminates a non-traveling road (48) if a driver of the vehicle (V) has indicated his or her intention to move the vehicle (V) into a traveling road (46), while the light distribution control device (10) is provided with information concerning the traveling road of the vehicle (V) and while a normal light distribution pattern (PAn) is formed that includes, in an illumination range thereof, a side illuminating the traveling road (46) of the vehicle (V) at a forked road (44) and a side illuminating the non-traveling road (48), and to form a guiding light distribution pattern (PAi) in which an illuminance of light that illuminates the traveling road (46) is higher than the illuminance of the light that illuminates the non-traveling road (48).

[Item 9]

A vehicular lamp system (1), comprising:

a light distribution variable lamp (4) capable of illuminating a region ahead of a vehicle (V) with a visible light beam (L1) of a variable intensity distribution; and the light distribution control device (10) according to any one of Items 1 to 8.

[Item 10]

A light distribution control method of controlling formation of a light distribution pattern (PAn, PAi) by a light distribution variable lamp (4) capable of illuminating a region ahead of a vehicle (V) with a visible light beam (L1) of a variable intensity distribution, the light distribution control method comprising:

controlling the light distribution variable lamp (4) so as to reduce an illuminance of light that illuminates a non-traveling road (48) when the vehicle (V) reaches a first location (X) a predetermined distance before a forked road (44), while a normal light distribution pattern (PAn) is formed that includes, in an illumination range thereof, a side illuminating a traveling road (46) of the vehicle (V) at the forked road (44) and a side illuminating the non-traveling road (48), and to form a guiding light distribution pattern (PAi) in which an illuminance of light that illuminates the traveling road (46) is higher than the illuminance of the light that illuminates the non-traveling road (48).

[Item 11]

A light distribution control method of controlling formation of a light distribution pattern (PAn, PAi) by a light distribution variable lamp (4) capable of illuminating a region ahead of a vehicle (V) with a visible light beam (L1) of a variable intensity distribution, the light distribution control method comprising:

controlling the light distribution variable lamp (4) so as to reduce an illuminance of light that illuminates a non-traveling road (48) if a driver of the vehicle (V) has indicated his or her intention to move the vehicle (V) into a traveling road (46), while the light distribution control device (10) is provided with information concerning the traveling road of the vehicle (V) and while a normal light distribution pattern (PAn) is formed that includes, in an illumination range thereof, a side illuminating the traveling road (46) of the vehicle (V) at a forked road (44) and a side illuminating the non-traveling road (48), and to form a guiding light distribution pattern (PAi) in which an illuminance of light that illuminates the traveling road (46) is higher than the illuminance of the light that illuminates the non-traveling road (48).

Embodiment 3

Figure 6:
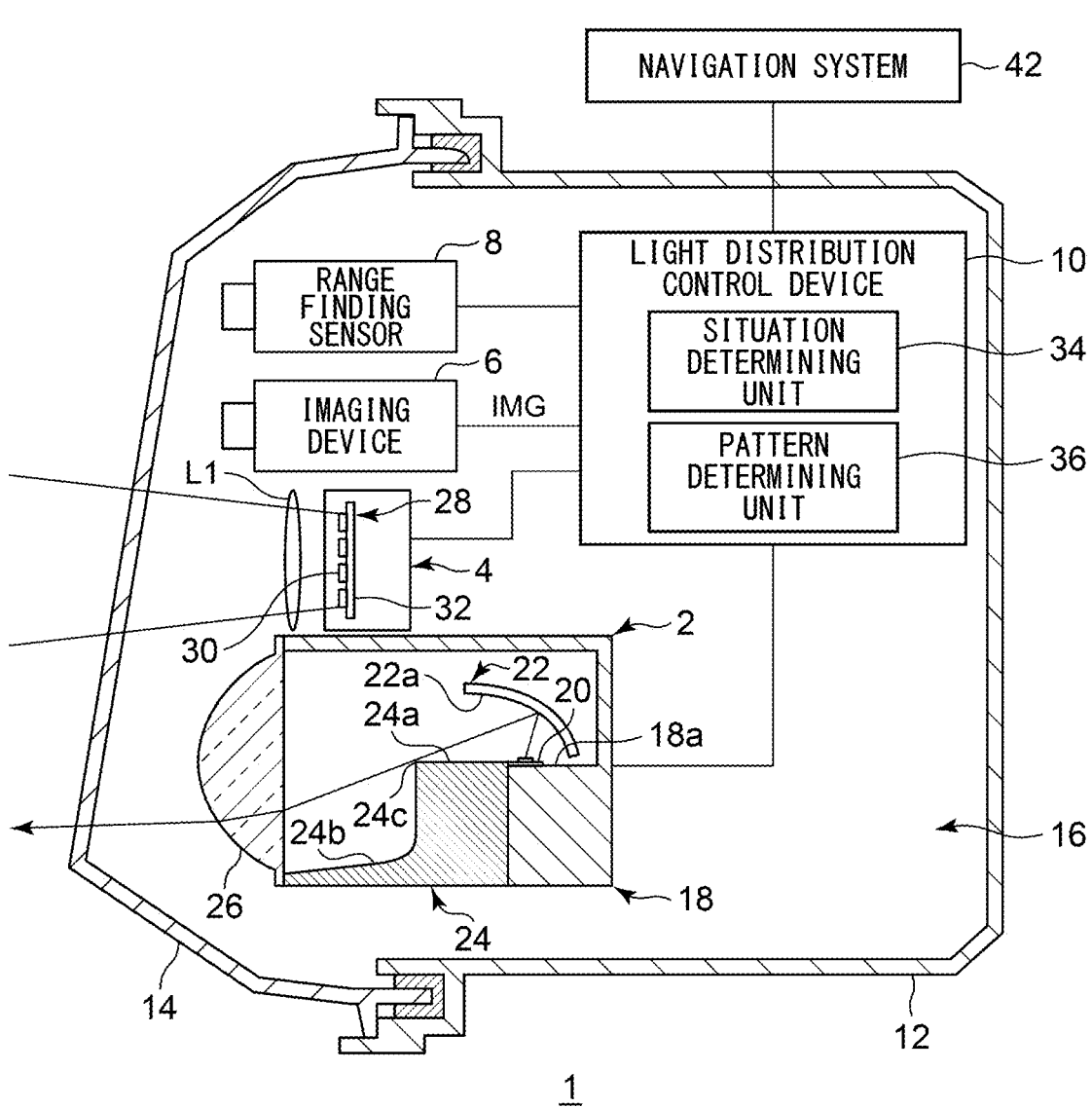
FIG. 6 shows a schematic configuration of a vehicular lamp system according to Embodiment 3.

FIG. 6 shows a schematic configuration of a vehicular lamp system 1 according to Embodiment 3. FIG. 6 depicts some of the constituent elements of the vehicular lamp system 1 in the form of functional blocks. These functional blocks are implemented, in terms of their hardware configuration, by elements and/or circuits, such as a CPU or memory of a computer, or implemented, in terms of their software configuration, by a computer program or the like. It is to be appreciated by a person skilled in the art that these functional blocks can be implemented in a variety of forms through combinations of hardware and software.

The vehicular lamp system 1 includes a low beam unit 2, an ADB unit 4, an imaging device 6, a range finding sensor 8, and a light distribution control device 10. The vehicular lamp system 1 according to the present embodiment further includes a lamp body 12 and a light transmissive cover 14. The lamp body 12 has an opening that opens to the front of the vehicle. The light transmissive cover 14 is mounted so as to cover the opening of the lamp body 12. The lamp body 12 and the light transmissive cover 14 form a lamp room 16. The low beam unit 2, the ADB unit 4, the imaging device 6, the range finding sensor 8, and the light distribution control device 10 are housed in the lamp room 16.

Herein, the imaging device 6, the range finding sensor 8, and the light distribution control device 10 may each be provided outside the lamp room 16, such as in the vehicle. The imaging device 6 may be constituted by an onboard camera. The whole or a part of the light distribution control device 10 may be constituted by a vehicle ECU. The low beam unit 2 and the ADB unit 4 may be housed in separate lamp rooms 16.

The low beam unit 2 includes a light source mounting portion 18, a light source 20, a reflector 22, a shade member 24, and a projection lens 26. The light source mounting portion 18 is formed, for example, by a metallic material, such as aluminum, and is supported on the lamp body 12 via a bracket (not illustrated). The light source mounting portion 18 has a light source mounting surface 18a. The light source mounting surface 18a according to the present embodiment extends in a substantially horizontal direction. The light source 20 is mounted on the light source mounting surface 18a.

The light source 20 is, for example, a light emitting diode (LED). The light source 20 may also be, for example but not limited to, a semiconductor light source other than an LED, such as a laser diode (LD) or an organic or inorganic electroluminescence (EL) element; an incandescent lamp; a halogen lamp; or a discharge lamp. The light source 20 emits light toward the reflector 22. The reflector 22 has a generally dome-like shape. The reflector 22 is disposed so as to cover the light source 20 from directly above in the vertical direction and is fixed to the light source mounting portion 18. The reflector 22 has a reflective surface 22a formed by a part of a spheroidal surface. The reflective surface 22a has a first focal point and a second focal point. The second focal point is located further to the front of the lamp than is the first focal point. The position of the reflector 22 relative to the light source 20 is set such that the position of the light source 20 substantially coincides with the first focal point of the reflective surface 22a.

The shade member 24 is fixed to the side of the light source mounting portion 18 on the lamp's front side. The shade member 24 includes a flat portion 24a disposed substantially horizontally and a curved portion 24b located further to the front of the lamp than is the flat portion 24a. The curved portion 24b is curved downward so as not to block the entry of light source light into the projection lens 26. The position of the reflector 22 relative to the shade member 24 is set such that a ridge 24c formed by the flat portion 24a and the curved portion 24b is located around the second focal point of the reflective surface 22a. The projection lens 26 is fixed at the leading end of the curved portion 24b. The projection lens 26 is formed, for example, by a plano-convex aspherical lens and projects an inverted image of a light source image formed in a posterior focal plane onto a virtual vertical screen in front of the lamp. The projection lens 26 is disposed in the optical axis of the low beam unit 2 such that the posterior focal point of the projection lens 26 substantially coincides with the second focal point of the reflective surface 22a.

Light emitted from the light source 20 is reflected by the reflective surface 22a, travels near the ridge 24c, and enters the projection lens 26. The light that has entered the projection lens 26 illuminates the space in front of the lamp as substantially parallel light. At this point, the shade member 24 blocks part of the light emitted by the light source 20 from traveling to the front of the lamp. Specifically, part of the light emitted from the light source 20 is reflected by the flat portion 24a. In other words, the light from the light source 20 is selectively cut off at the ridge 24c serving as a boundary. Thus, a light distribution pattern including a cutoff line corresponding to the shape of the ridge 24c, that is, a low beam light distribution pattern (see FIG. 7) is formed in the region ahead of the vehicle.

It is to be noted that the structure of the low beam unit 2 is not limited to the one described above, and a known structure can be employed. For example, the shade member 24 that forms a cutoff line may be of a shutter type in which a shade plate moves back and forth with respect to the optical axis. The low beam unit 2 does not have to include the reflector 22 and/or the projection lens 26.

The ADB unit 4 is constituted by a light distribution variable lamp capable of illuminating a region ahead of the host vehicle with a visible light beam L1 of a variable intensity distribution. The ADB unit 4 is supported on the lamp body 12 via a bracket (not illustrated). The ADB unit 4 according to the present embodiment includes a light source array 28. The light source array 28 includes a plurality of light sources 30 arrayed in a matrix and a circuit board 32 that turns on or off the light sources 30 independently of each other. Preferred examples of a light source 30 include a semiconductor light emitting element, such as an LED, an LD, or an organic or inorganic EL element. The number of the light sources 30, that is, the resolving power (the resolution) of the ADB unit 4 is, for example, from 1,000 pixels to 1,300,000 pixels.

It is to be noted that the structure of the ADB unit 4 is not limited to the one described above, and a known structure can be employed. The light distribution variable lamp constituting the ADB unit 4 may be, for example but not limited to, a pattern forming device of a matrix type, such as a digital mirror device (DMD) or a liquid crystal device, or a pattern forming device of a scan optic type that scans the space ahead of the host vehicle with light source light. The low beam unit 2 and the ADB unit 4 may be integrated into a unit.

The imaging device 6 has sensitivity to the visible light range and generates an image IMG by capturing an image of the region ahead of the vehicle. An image IMG that the imaging device 6 has acquired is sent to the light distribution control device 10. The imaging device 6 captures an image of the space ahead of the host vehicle repeatedly at predetermined timings and sends an image IMG to the light distribution control device 10 each time the imaging device 6 acquires an image IMG.

The range finding sensor 8 has its measuring direction oriented to the region ahead and acquires information about the region ahead. The range finding sensor can be constituted by, for example but not limited to, a millimeter-wave radar, or LiDAR (a light detection and ranging, or a laser imaging detection and ranging). The range finding sensor can, based on the length of time from the timing at which the range finding sensor has emitted a millimeter wave or light toward the region ahead to the detection of a reflected wave or reflected light, acquire the presence of an object associated with the reflected wave or the reflected light as well as the distance to that object. Furthermore, the range finding sensor can acquire information about the movement of the object by accumulating such distance data with the distance data linked to the detection position of the object. The measurement result of the range finding sensor 8 is sent to the light distribution control device 10.

The light distribution control device 10 includes, in one example, a situation determining unit 34 and a pattern determining unit 36. The light distribution control device 10 can be constituted by a digital processor. The light distribution control device 10 may be constituted, for example but not limited to, by a combination of a microcomputer including a CPU and a software program or by a field programmable gate array (FPGA) or an application specific IC (ASIC). Each unit of the light distribution control device 10 operates as an integrated circuit constituting the light distribution control device 10 executes a program stored in a memory.

Figure 7:
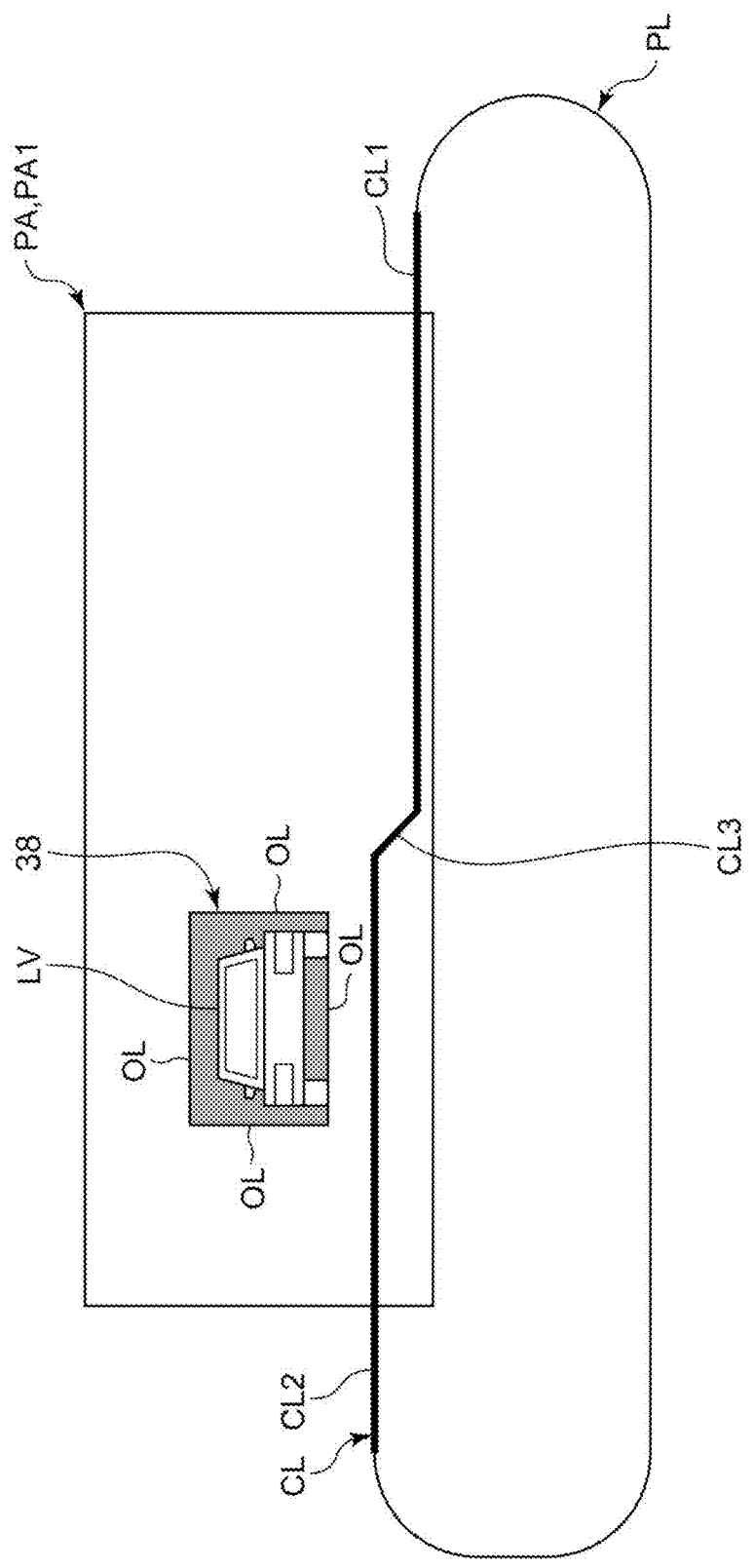
FIG. 7 is a schematic diagram showing a light distribution pattern that a low beam unit and an ADB unit form.

The light distribution control device 10 controls formation of a light distribution pattern by the low beam unit 2 and the ADB unit 4. A shape of a light distribution pattern formed by each lamp unit and control, by the light distribution control device 10, of formation of a light distribution pattern will be described below. FIG. 7 is a schematic diagram showing a light distribution pattern that the low beam unit 2 and the ADB unit 4 form. A light distribution pattern is understood as a two-dimensional illuminance distribution of an illumination pattern that each lamp unit forms on a virtual vertical screen in front of the host vehicle. FIG. 7 shows a light distribution pattern for a road where vehicles travel on the left-hand side.

The low beam unit 2 can form a low beam light distribution pattern PL by projecting light from the light source 20. The low beam light distribution pattern PL has a cutoff line CL at its upper end. The cutoff line CL includes a first partial cutoff line CL1, a second partial cutoff line CL2, and a third partial cutoff line CL3. The first partial cutoff line CL1 extends in the horizontal direction in an oncoming lane. The second partial cutoff line CL2 extends in the horizontal direction in the host vehicle's lane and at a position higher than the position of the first partial cutoff line CL1. The third partial cutoff line CL3 extends diagonally between the first partial cutoff line CL1 and the second partial cutoff line CL2 so as to connect the first partial cutoff line CL1 and the second partial cutoff line CL2.

The ADB unit 4 can form a light distribution variable pattern PA above the cutoff line CL by projecting light from the plurality of light sources 30. The light distribution variable pattern PA is formed, for example, in a region where a known high beam light distribution pattern is to be formed. The light distribution variable pattern PA has a structure formed by a collection of a plurality of partial regions arrayed in a matrix. In one example, the partial regions and the light sources 30 are in a one-to-one correspondence. The illuminance of each partial region can be controlled independently of each other as the lit state of each light source 30 is adjusted.

The light distribution control device 10 can execute ADB control as described below. Specifically, the light distribution control device 10 finds the presence and position of a forward vehicle based on an image IMG obtained from the imaging device 6. A forward vehicle includes a leading vehicle and an oncoming vehicle. A leading vehicle travels ahead of the host vehicle and in the same direction as the host vehicle, and an oncoming vehicle travels forward of the host vehicle but in the direction opposite to the host vehicle. In FIG. 7, a leading vehicle LV is shown as an example. The light distribution control device 10 can find the presence and position of a forward vehicle by subjecting an image IMG to known image processing or a known image analysis. The light distribution control device 10 can differentiate between a leading vehicle LV and an oncoming vehicle based, for example, on the position of the forward vehicle or on the difference between the red color of a tail lamp or a stop lamp and the white color of a headlamp. Herein, the light distribution control device 10 may detect a forward vehicle based on a measurement result of the range finding sensor 8. The light distribution control device 10 may acquire information concerning a forward vehicle from a vehicle ECU.

Upon detecting a forward vehicle, the light distribution control device 10 sets, in a light distribution variable pattern PA, a dimmed portion 38 that overlaps the forward vehicle. The light distribution control device 10 then controls the ADB unit 4 so as to form a light distribution variable pattern PA that includes the dimmed portion 38. As described above, the light distribution variable pattern PA is formed in a region where a high beam light distribution pattern is to be formed. Accordingly, the dimmed portion 38 is formed in the region above the cutoff line CL of the low beam light distribution pattern PL.

According to the present embodiment, the illuminance of the dimmed portion 38 is substantially zero. Herein, the illuminance of the dimmed portion 38 may be higher than zero but lower than the illuminance of a portion that overlaps a region in which no forward vehicle is present. The illuminance of the dimmed portion 38 can be set as appropriate based on experiments or simulations with, for example, the degree of glare experienced by the driver of a forward vehicle taken into consideration. Forming the light distribution variable pattern PA that includes the dimmed portion 38 overlapping the forward vehicle can reduce the glare on the driver of the forward vehicle and can also improve the visibility of the driver of the host vehicle.

Figure 8A:
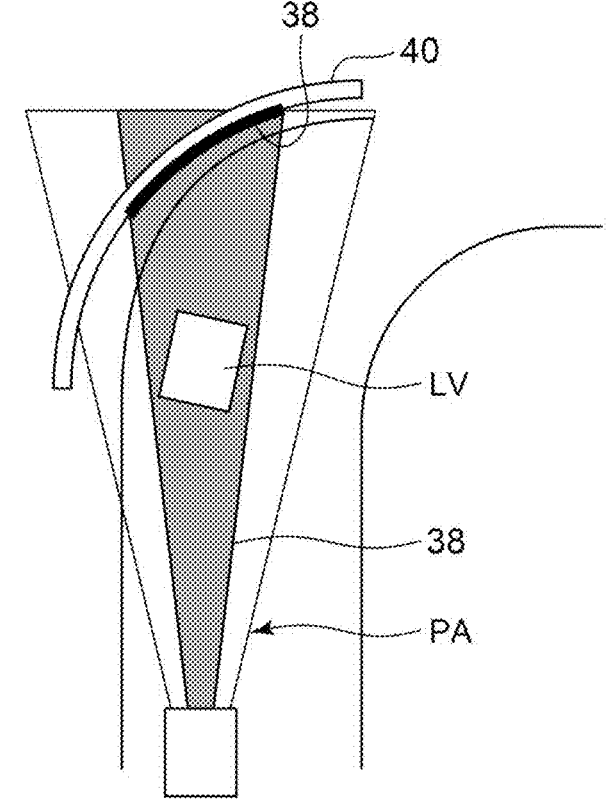
FIGS. 8A and 8B are schematic diagrams for describing a situation that may cause the driver of a leading vehicle to feel a sense of discomfort.
Figure 8B:
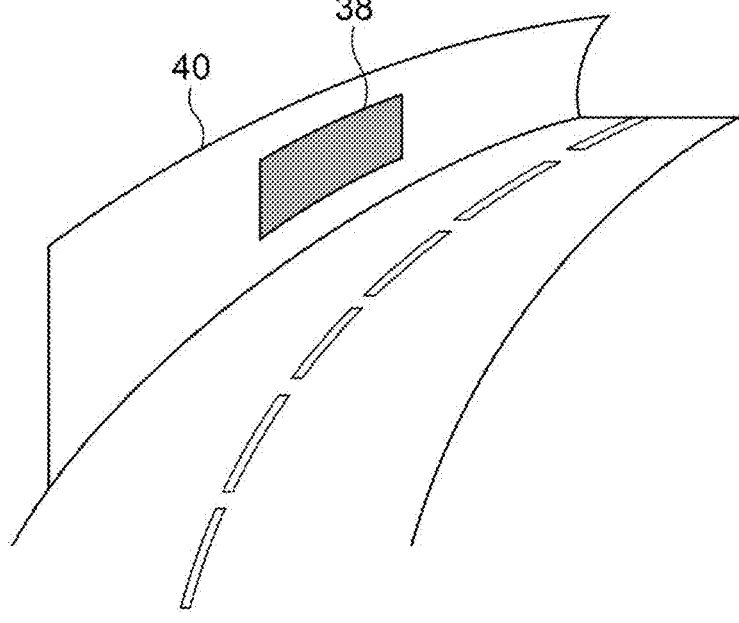

Meanwhile, depending on the situation of the region ahead, forming the dimmed portion 38 may cause a sense of discomfort in the driver of the leading vehicle LV. FIGS. 8A and 8B are schematic diagrams for describing a situation that may cause a sense of discomfort in the driver of the leading vehicle LV. When an object that can be regarded as a screen (referred to below as a screen object 40, as appropriate), such as a wall (a fence), a hedge, or a road surface, is present on a side over the leading vehicle LV in the region ahead of the host vehicle, the light distribution variable pattern PA that the host vehicle forms is projected onto the screen object 40. If the light distribution variable pattern PA includes a dimmed portion 38, the dimmed portion 38 is also reflected on the screen object 40. This phenomenon in which a dimmed portion 38 is reflected on a screen object 40 is referred to as a ghost phenomenon in the present disclosure.

As shown in FIG. 8B, the dimmed portion 38 reflected on the screen object 40 may enter the view of the driver of the leading vehicle LV, which may cause a sense of discomfort in the driver. In particular, the dimmed portion 38 moves on the screen object 40 in accordance with the positional relationship between the host vehicle and the leading vehicle LV. Therefore, the movement of the dimmed portion 38 may not be coordinated with the steering of the driver of the leading vehicle LV. Accordingly, the driver of the leading vehicle LV is likely to feel a sense of discomfort by the dimmed portion 38 reflected on the screen object 40. This should not be regarded as a problem generally recognized by a person skilled in the art, and the present inventors themselves have uniquely recognized this problem.

Thus, the light distribution control device 10 according to the present embodiment executes light distribution control as described below. Specifically, the situation determining unit 34 determines whether a leading vehicle LV is present. Alternatively, the situation determining unit 34 acquires information concerning a leading vehicle LV from a vehicle ECU. The situation determining unit 34 also determines whether a screen object 40 that functions as a screen onto which a light distribution variable pattern PA is projected is present in the region ahead.

A conceivable situation in which a screen object appears in the region ahead is a situation in which a road of a specific shape, such as a curved road, a forked road (including a three-forked road, a four-forked road, a five or more multi-forked road), or an inclined road, is present ahead of the host vehicle. At a curved road or a forked road, a wall or hedge, for example, extending along an edge of the road may turn into a screen object 40. At an inclined road, the road surface of an uphill that appears ahead while the host vehicle is traveling on a horizontal road or the road surface of a horizontal road that appears ahead while the host vehicle is traveling on a downhill may turn into a screen object 40.

Therefore, the situation determining unit 34 determines that a screen object 40 is present in the region ahead when a road having any of the specific shapes described above is present ahead of the host vehicle. For example, the situation determining unit 34 acquires information concerning the travel route of the host vehicle from the navigation system 42 provided in the vehicle. Then, based on this information, the situation determining unit 34 finds the presence of a road having a specific shape in the region ahead. The situation determining unit 34 can also find the presence of a road having a specific shape in the region ahead based on an image IMG acquired from the imaging device 6. In one example, the situation determining unit 34 can determine indiscriminately that a screen object 40 is present if a road having a specific shape is present ahead, regardless of whether a screen object 40 is actually present. This configuration can reduce the load on the light distribution control device 10. Herein, the situation determining unit 34 may detect the actual presence of a screen object 40.

If it is determined that no screen object 40 is present while the leading vehicle LV is present, the pattern determining unit 36 sets a first light distribution variable pattern PA1 that includes a dimmed portion 38 corresponding to the leading vehicle LV (see FIG. 7). The first light distribution variable pattern PA1 according to the present embodiment includes a rectangular dimmed portion 38 having linear outlines OL at its top, bottom, right, and left.

If it is determined that a screen object 40 is present while the leading vehicle LV is present, the pattern determining unit 36 sets a second light distribution variable pattern PA2. The second light distribution variable pattern PA2 is a pattern that is based on the first light distribution variable pattern PA1 but includes a dimmed portion 38 having a shape different from that of the dimmed portion 38 of the first light distribution variable pattern PA1. To be more specific, the second light distribution variable pattern PA2 has such a shape that at least one or more of the outlines OL of the dimmed portion 38 of the first light distribution variable pattern PA1 are blurred. Alternatively, the second light distribution variable pattern PA2 has such a shape that the dimmed portion 38 of the first light distribution variable pattern PA1 is expanded to the outer edge of the first light distribution variable pattern PA1 at least in one direction.

The burring of the outlines OL can be achieved, for example, by gradually raising the luminance of the light sources 30 corresponding to the boundary region of the dimmed portion 38 from the inner side to the outer side of the dimmed portion 38. In other words, "blurring" means that the gradient of the change in the illuminance in the boundary region of the dimmed portion 38 is gentler in the second light distribution variable pattern PA2 than in the first light distribution variable pattern PA1. Preferably, blurred portions of the outlines OL are formed at the outer side of the respective outlines OL of the dimmed portion 38 of the first light distribution variable pattern PA1.

Figures 9A, 9B:
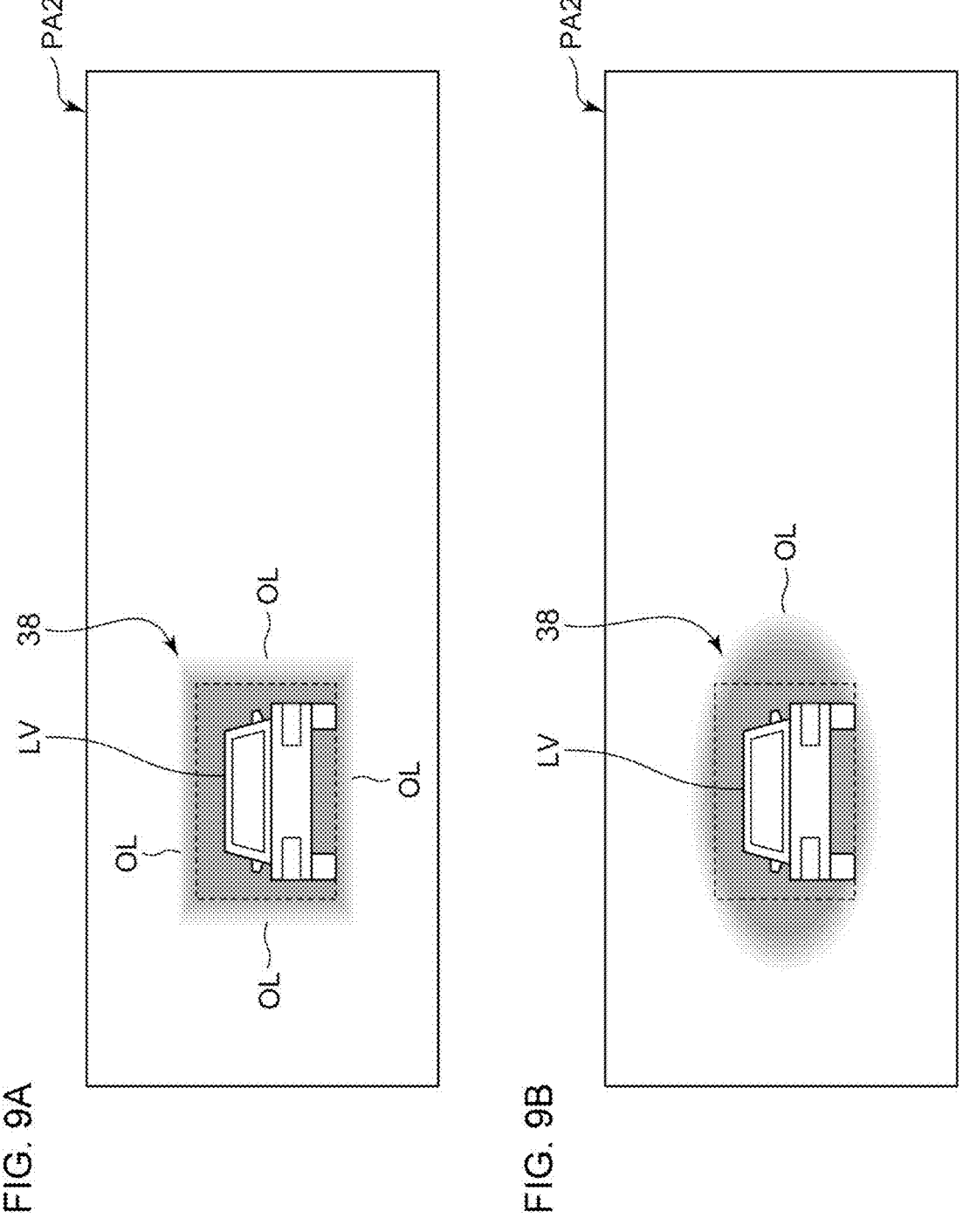
FIGS. 9A and 9B are schematic diagrams of a second light distribution variable pattern.
Figures 10A, 10B:
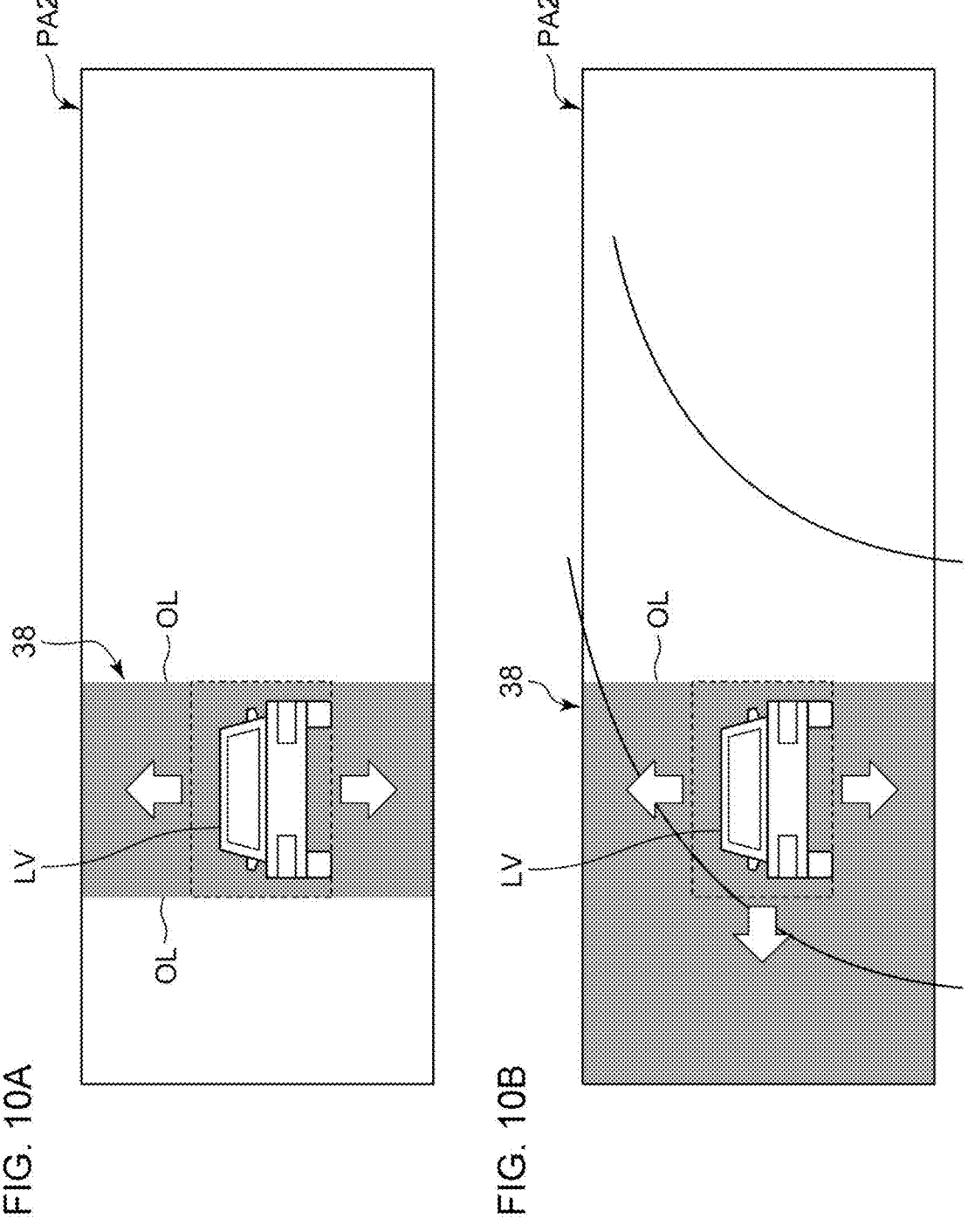
FIGS. 10A and 10B are schematic diagrams of a second light distribution variable pattern.

FIGS. 9A, 9B, 10A, and 10B are schematic diagrams of a second light distribution variable pattern PA2. FIG. 9A shows a first example of the second light distribution variable pattern PA2, FIG. 9B shows a second example of the second light distribution variable pattern PA2, FIG. 10A shows a third example of the second light distribution variable pattern PA2, and FIG. 10B shows a fourth example of the second light distribution variable pattern PA2. FIGS. 9A, 9B, 10A, and 10B indicate, by the dashed lines, the outlines OL of the dimmed portion 38 of the first light distribution variable pattern PA1, that is, the outlines OL that have not been modified.

In the first example shown in FIG. 9A, the second light distribution variable pattern PA2 is a pattern in which the outlines OL of the dimmed portion 38 are blurred while retaining their straight line shape. Therefore, the dimmed portion 38 of the second light distribution variable pattern PA2 has a rectangular shape with the blurred outlines OL.

In the second example shown in FIG. 9B, the second light distribution variable pattern PA2 is a pattern in which the outlines OL of the dimmed portion 38 are curved and blurred. Therefore, the dimmed portion 38 of the second light distribution variable pattern PA2 has a circular or elliptical shape with the blurred outlines OL.

In the third example shown in FIG. 10A, the second light distribution variable pattern PA2 is a pattern having such a shape that the dimmed portion 38 of the first light distribution variable pattern PA1 is expanded upward and downward to the outer edge of the first light distribution variable pattern PA1. Therefore, the dimmed portion 38 has only the right and left outlines OL within the second light distribution variable pattern PA2.

In the fourth example shown in FIG. 10B, the second light distribution variable pattern PA2 is a pattern having such a shape that the dimmed portion 38 of the first light distribution variable pattern PA1 is expanded upward, downward, and either rightward or leftward to the outer edge of the first light distribution variable pattern PA1. The second light distribution variable pattern PA2 of this fourth example is formed if the situation determining unit 34 determines that the road ahead of the host vehicle is a curved road. The dimmed portion 38 is then expanded upward, downward, and in the direction opposite to the direction to which the road curves. The direction to which the road curves can be found, for example, based on information from the navigation system 42 or through image processing of an image IMG. In the example shown in FIG. 10B, a road that curves to the right is present ahead of the host vehicle, and thus the dimmed portion 38 is expanded upward, downward, and leftward. Therefore, the dimmed portion 38 has only the right outline OL within the second light distribution variable pattern PA2.

When the outlines OL of the dimmed portion 38 are blurred or when one or more of the outlines OL are expanded to the outer edge of the light distribution variable pattern PA to be removed from within the light distribution variable pattern PA, the sense of discomfort that the driver of the leading vehicle LV experiences due to a ghost phenomenon can be reduced, as compared to a case in which the outlines OL are clearer or there are more outlines OL. Herein, a dimmed portion 38 that overlaps an oncoming vehicle has outlines of the same shape between a first light distribution variable pattern PA1 and a second light distribution variable pattern PA2.

Figure 11:
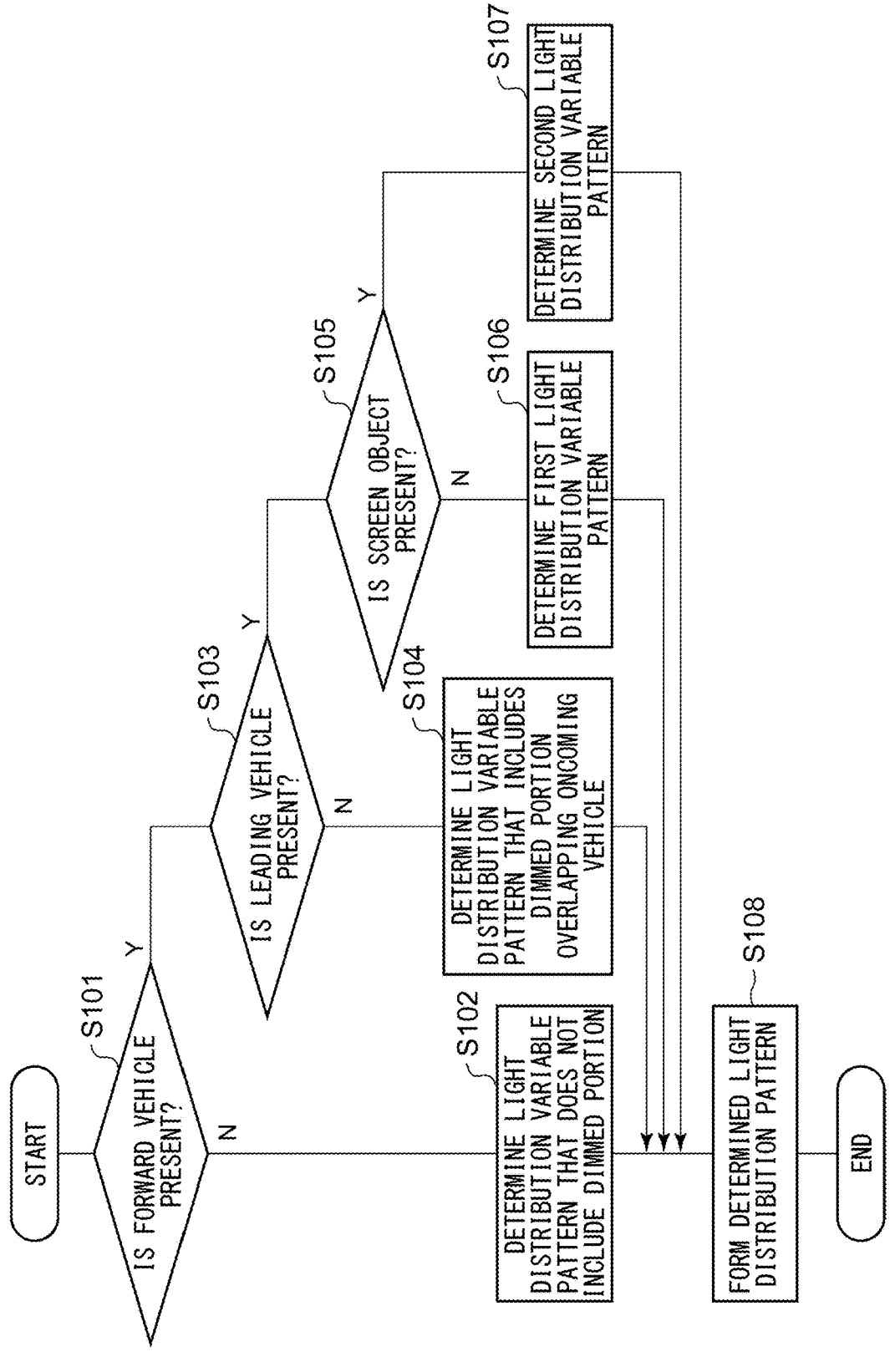
FIG. 11 is a flowchart showing an example of light distribution control that a light distribution control device executes.

FIG. 11 is a flowchart showing an example of light distribution control that the light distribution control device 10 executes. This flow is executed repeatedly at predetermined timings, for example, when execution of light distribution control is instructed via a light switch (not illustrated) and when the ignition is on.

The light distribution control device 10 determines whether a forward vehicle is present (S101). If no forward vehicle is present (N at S101), the light distribution control device 10 sets a light distribution variable pattern PA that does not include any dimmed portion 38 as a pattern that the ADB unit 4 is to form (S102). If a forward vehicle is present (Y at S101), the light distribution control device 10 determines whether the forward vehicle includes a leading vehicle LV (S103). If the forward vehicle includes no leading vehicle LV (N at S103), this case indicates that only an oncoming vehicle is present. Therefore, the light distribution control device 10 sets a light distribution variable pattern PA that includes a dimmed portion 38 that overlaps the oncoming vehicle as a pattern that the ADB unit 4 is to form (S104). If the forward vehicle includes a leading vehicle LV (Y at S103), the light distribution control device 10 determines whether a screen object 40 is present ahead of the host vehicle (S105).

If the light distribution control device 10 determines that no screen object 40 is present (N at S105), the light distribution control device 10 sets a first light distribution variable pattern PA1 as a pattern that the ADB unit 4 is to form (S106). If the light distribution control device 10 determines that a screen object 40 is present (Y at S105), the light distribution control device 10 sets a second light distribution variable pattern PA2 as a pattern that the ADB unit 4 is to form (S107). Herein, if there is also an oncoming vehicle in the region ahead, the light distribution pattern set at step S106 or step S107 also includes a dimmed portion 38 that overlaps the oncoming vehicle. Then, the light distribution control device 10 controls the ADB unit 4 so as to form the determined light distribution pattern (S108), and terminates this routine.

As described above, the light distribution control device 10 according to the present embodiment controls formation of a light distribution variable pattern PA by the ADB unit 4 (a light distribution variable lamp) capable of illuminating a region ahead of the vehicle with a visible light beam L1 of a variable intensity distribution. The light distribution control device 10 includes the situation determining unit 34 that determines whether a screen object 40 that functions as a screen onto which a light distribution variable pattern PA is projected is present in the region ahead. The light distribution control device 10 also includes the pattern determining unit 36 that, in a situation in which a leading vehicle LV is present, sets a first light distribution variable pattern PA1 that includes a dimmed portion 38 corresponding to the leading vehicle LV if it is determined that no screen object 40 is present, or sets a second light distribution variable pattern PA2 having such a shape that at least one or more of the outlines OL of a dimmed portion 38 of a first light distribution variable pattern PA1 are blurred or that the dimmed portion 38 is expanded to the outer edge of the first light distribution variable pattern PA1 in at least one direction if it is determined that a screen object 40 is present.

In this manner, as the outlines OL of the dimmed portion 38 to be projected onto the screen object 40 are blurred or as the number of the outlines OL of the dimmed portion 38 to be projected onto the screen object 40 is reduced, the sense of discomfort that the driver of the leading vehicle LV experiences due to a ghost phenomenon can be alleviated. This configuration can further improve the traffic environment.

The dimmed portion 38 according to the present embodiment has a rectangular shape having outlines OL at its top, bottom, right, and left. A second light distribution variable pattern PA2 of one example is a pattern in which the outlines OL are blurred while retaining their straight line shape. Meanwhile, a second light distribution variable pattern PA2 of another example is a pattern in which the outlines OL are curved and blurred. A second light distribution variable pattern PA2 of yet another example is a pattern of which the dimmed portion 38 is expanded upward and downward to the outer edge of the first light distribution variable pattern PA1. A second light distribution variable pattern PA2 of still another example is a pattern of which the dimmed portion 38 is expanded to the outer edge of the first light distribution variable pattern PA1 upward, downward, and in the direction opposite to the direction to which a road curves. These patterns can reduce the sense of discomfort that the driver of a leading vehicle LV experiences, while keeping the light distribution control from becoming complex.

The dimmed portion 38 according to the present embodiment is formed in the region above the cutoff line CL of the low beam light distribution pattern PL. The dimmed portion 38 formed above the cutoff line CL is more likely to cause a ghost phenomenon than the dimmed portion 38 formed below the cutoff line CL. Therefore, as the second light distribution variable pattern PA2 is formed through light distribution control that forms the dimmed portion 38 above the cutoff line CL, the effectiveness of forming the second light distribution variable pattern PA2 can be further increased.

Thus far, Embodiment 3 according to the present invention has been described in detail. Embodiment 3 described above merely illustrates a specific example for implementing the present invention. The content of the embodiment does not limit the technical scope of the present invention, and a number of design changes, including modification, addition, and deletion of constituent elements, can be made within the scope that does not depart from the sprit of the invention defined by the claims. A new embodiment resulting from adding a design change has advantageous effects of the embodiment combined as well as the advantageous effects of the modification. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also valid as an aspect of the present invention. Hatching added along a section in the drawings does not limit the material of such with hatching.

Modified Example 2

According to Embodiment 3, a light distribution variable pattern PA to be formed is selected in accordance with whether a screen object 40 is present. In contrast, according to the present modified example, a light distribution variable pattern PA is selected in accordance with, in addition to whether a screen object 40 is present, the distance to the screen object 40. Specifically, the pattern determining unit 36 sets a second light distribution variable pattern PA2 if it is determined that a screen object 40 is present and if the distance to the screen object 40 from the host vehicle is no greater than a predetermined value.

For example, the situation determining unit 34, instead of determining whether a screen object 40 is present based only on the shape of the road ahead of the host vehicle, detects the actual presence of a screen object 40 and the distance to the screen object 40. The situation determining unit 34 can detect the presence of a screen object 40 and the distance to the screen object 40 from the host vehicle based, for example, on an image IMG acquired from the imaging device 6 or a measurement result of the range finding sensor 8. Then, if the situation determining unit 34 detects the presence of a screen object 40 and determines that the distance to the screen object 40 from the host vehicle is no greater than a predetermined value, the pattern determining unit 36 controls the ADB unit 4 so as to form a second light distribution variable pattern PA2.

The shorter the distance from the host vehicle to the screen object 40, the more clearly the dimmed portion 38 is reflected on the screen object 40. Therefore, as the screen object 40 is closer to the host vehicle, a ghost phenomenon is more likely to be recognized by the driver of the leading vehicle LV. Accordingly, as the distance to the screen object 40 is included in the condition for forming a second light distribution variable pattern PA2, the instance of forming a second light distribution variable pattern PA2 can be limited to a situation in which a ghost phenomenon is more noticeable.

Thus, the frequency with which the visibility of the driver of the host vehicle is reduced due to the formation of a second light distribution variable pattern PA2 can be reduced. Furthermore, the effectiveness of forming a second light distribution variable pattern PA2 can be further increased. The "predetermined value" concerning the distance from the host vehicle to a screen object 40 can be set as appropriate based on experiments or simulations with, for example, the degree of visibility of a ghost phenomenon taken into consideration. The predetermined value is preferably 80 meters.

Modified Example 3

According to Embodiment 3, a light distribution variable pattern PA to be formed is selected in accordance with whether a screen object 40 is present. In contrast, according to the present modified example, a light distribution variable pattern PA is selected in accordance with, in addition to whether a screen object 40 is present, the distance to the leading vehicle LV. Specifically, the pattern determining unit 36 sets a second light distribution variable pattern PA2 if it is determined that a screen object 40 is present and if the distance to the leading vehicle LV from the host vehicle is no greater than a predetermined value.

The situation determining unit 34 can detect the distance to the leading vehicle LV from the host vehicle based, for example, on an image IMG acquired from the imaging device 6 or a measurement result of the range finding sensor 8. Then, if the situation determining unit 34 detects the presence of a screen object 40 and determines that the distance to the leading vehicle LV from the host vehicle is no greater than a predetermined value, the pattern determining unit 36 controls the ADB unit 4 so as to form a second light distribution variable pattern PA2.

The shorter the distance from the host vehicle to the leading vehicle LV, the greater the dimmed portion 38. Within the range in which the dimmed portion 38 is contained within the second light distribution variable pattern PA2, the greater the dimmed portion 38, the more likely the driver of the leading vehicle LV recognizes a ghost phenomenon. Accordingly, as the distance to the leading vehicle LV is included in the condition for forming a second light distribution variable pattern PA2, the instance of forming a second light distribution variable pattern PA2 can be limited to a situation in which a ghost phenomenon is more noticeable.

Thus, the frequency with which the visibility of the driver of the host vehicle is reduced due to the formation of a second light distribution variable pattern PA2 can be reduced. Furthermore, the effectiveness of forming a second light distribution variable pattern PA2 can be further increased. The "predetermined value" concerning the distance from the host vehicle to the leading vehicle LV can be set as appropriate based on experiments or simulations with, for example, the degree of visibility of a ghost phenomenon taken into consideration. The predetermined value is preferably 30 meters.

Herein, with Modified Example 2 and Modified Example 3 combined, the ADB unit 4 may be controlled so as to form a second light distribution variable pattern PA2 if the situation determining unit 34 detects the presence of a screen object 40, determines that the distance to the screen object 40 from the host vehicle is no greater than a predetermined value, and determines that the distance from the host vehicle to the leading vehicle LV is no greater than a predetermined value.

The invention according to Embodiment 3 described above may be identified by the items indicated below.

[Item 12]

A light distribution control device (10) that controls formation of a light distribution pattern (PA) by a light distribution variable lamp (4) capable of illuminating a region ahead of a vehicle with a visible light beam (L1) of a variable intensity distribution, the light distribution control device (10) comprising:

a situation determining unit (34) that determines whether an object (40) that functions as a screen onto which the light distribution pattern (PA) is projected is present in the region ahead; and a pattern determining unit (36) that, in a situation in which a leading vehicle (LV) is present, sets a first light distribution pattern (PA1) that includes a dimmed portion (38) corresponding to the leading vehicle (LV) if it is determined that the object (40) is not present, or sets a second light distribution pattern (PA2) having such a shape that at least one or more of outlines (OL) of the dimmed portion (38) of the first light distribution pattern (PA1) are blurred or that the dimmed portion (38) is expanded to an outer edge of the first light distribution pattern (PA1) in at least one direction if it is determined that the object (40) is present.

[Item 13]

The light distribution control device (10) according to Item 12, wherein the dimmed portion (38) has a rectangular shape having the outlines (OL) at a top, bottom, right, and left thereof, and the second light distribution pattern (PA2) is a pattern in which the outlines (OL) are blurred while retaining a straight line shape.

[Item 14]

The light distribution control device (10) according to Item 12, wherein the dimmed portion (38) has a rectangular shape having the outlines (OL) at a top, bottom, right, and left thereof, and the second light distribution pattern (PA2) is a pattern in which the outlines (OL) are curved and blurred.

[Item 15]

The light distribution control device (10) according to Item 12, wherein the dimmed portion (38) has a rectangular shape having the outlines (OL) at a top, bottom, right, and left thereof, and the second light distribution pattern (PA2) is a pattern of which the dimmed portion (38) is expanded upward and downward to the outer edge of the first light distribution pattern (PA1).

[Item 16]

The light distribution control device (10) according to Item 12, wherein the situation determining unit (34) determines that the object (40) is present if a road ahead of the vehicle is a curved road, the dimmed portion (38) has a rectangular shape having the outlines (OL) at a top, bottom, right, and left thereof, and the second light distribution pattern (PA2) is a pattern of which the dimmed portion (38) is expanded to the outer edge of the first light distribution pattern (PA1) upward, downward, and in a direction opposite to a direction to which the curved road curves.

[Item 17]

The light distribution control device (10) according to any one of Items 12 to 16, wherein the pattern determining unit (36) sets the second light distribution pattern (PA2) if a distance to the object (40) is no greater than a predetermined value.

[Item 18]

The light distribution control device (10) according to any one of Items 12 to 17, wherein the pattern determining unit (36) sets the second light distribution pattern (PA2) if a distance to the leading vehicle (LV) is no greater than a predetermined value.

[Item 19]

The light distribution control device (10) according to any one of Items 12 to 18, wherein the dimmed portion (38) is formed in a region above a cutoff line (CL) of a low beam light distribution pattern (PL).

[Item 20]

A vehicular lamp system (1), comprising:

a light distribution variable lamp (4) capable of illuminating a region ahead of a vehicle with a visible light beam (L1) of a variable intensity distribution; and the light distribution control device (10) according to any one of Items 12 to 19.

[Item 21]

A light distribution control method of controlling formation of a light distribution pattern (PA) by a light distribution variable lamp (4) capable of illuminating a region ahead of a vehicle with a visible light beam (L1) of a variable intensity distribution, the light distribution control method comprising:

determining whether an object (40) that functions as a screen onto which the light distribution pattern (PA) is projected is present in the region ahead; and in a situation in which a leading vehicle (LV) is present, setting a first light distribution pattern (PA1) that includes a dimmed portion (38) corresponding to the leading vehicle (LV) if it is determined that the object (40) is not present, or setting a second light distribution pattern (PA2) having such a shape that at least one or more of outlines (OL) of the dimmed portion (38) of the first light distribution pattern (PA1) are blurred or that the dimmed portion (38) is expanded to an outer edge of the first light distribution pattern (PA1) in at least one direction if it is determined that the object (40) is present.

What is claimed is:

1. A light distribution control device that controls formation of a light distribution pattern by a light distribution variable lamp capable of illuminating a region ahead of a vehicle with a visible light beam of a variable intensity distribution, wherein the light distribution control device controls the light distribution variable lamp so as to, when the vehicle reaches a first location a predetermined distance before a forked road which branches into two or more roads, while a normal light distribution pattern is formed that includes, in an illumination range thereof, a side illuminating a road of the two or more roads that the vehicle is heading to and a side illuminating a road of the two or more roads that the vehicle is not heading to, form a guiding light distribution pattern which illuminates at least one of a first road surface at the entrance of the road of the two or more roads that the vehicle is heading to or a region extending vertically above the first road surface more brightly than a second road surface at the entrance of the road of the two or more roads that the vehicle is not heading to and a region extending vertically above the second road surface.

2. The light distribution control device according to claim 1, wherein the predetermined distance is a distance over which the visible light beam can reach the forked road.

3. The light distribution control device according to claim 1, wherein the guiding light distribution pattern is formed so as to overlap a region above a cutoff line of a low beam light distribution pattern.

4. The light distribution control device according to claim 1, wherein the light distribution control device controls the light distribution variable lamp so as to form the guiding light distribution pattern regardless of a road shape of the road of the two or more roads that the vehicle is heading to.

5. The light distribution control device according to claim 1, wherein the light distribution control device controls the light distribution variable lamp so as to form the guiding light distribution pattern regardless of a driver's steering.

6. The light distribution control device according to claim 1, wherein the light distribution control device controls the light distribution variable lamp so as to switch the guiding light distribution pattern to the normal light distribution pattern when the vehicle reaches a second location that is before the forked road and that is closer than the first location to the forked road.

7. The light distribution control device according to claim 1, wherein the light distribution control device controls the light distribution variable lamp so as to switch the guiding light distribution pattern to the normal light distribution pattern in response to receiving a predetermined stop instruction signal from an outside of the light distribution control device.

8. A light distribution control device that controls formation of a light distribution pattern by a light distribution variable lamp capable of illuminating a region ahead of a vehicle with a visible light beam of a variable intensity distribution, wherein the light distribution control device controls the light distribution variable lamp so as to, if a driver of the vehicle has indicated his or her intention to move the vehicle into a road of two or more roads which a forked road branches into, while the light distribution control device is provided with information concerning the road of the two or more roads which the forked road branches into and while a normal light distribution pattern is formed that includes, in an illumination range thereof, a side illuminating the road of the two or more roads which the forked road branches into and a side illuminating an other road of the two or more roads which the forked road branches into, form a guiding light distribution pattern which illuminates at least one of a first road surface at the entrance of the road of the two or more roads that the forked road branches into or a region extending vertically above the first road surface more brightly than a second road surface at the entrance of the other road of the two or more roads that the forked road branches into and a region extending vertically above the second road surface.

9. A vehicular lamp system, comprising:

a light distribution variable lamp capable of illuminating a region ahead of a vehicle with a visible light beam of a variable intensity distribution; and the light distribution control device according to claim 1.

* * * * *